(12) United States Patent
Wakazono et al.

(10) Patent No.: US 8,564,862 B2
(45) Date of Patent: Oct. 22, 2013

(54) APPARATUS, METHOD AND PROGRAM FOR REDUCING DETERIORATION OF PROCESSING PERFORMANCE WHEN GRADUATION CORRECTION PROCESSING AND NOISE REDUCTION PROCESSING ARE PERFORMED

(75) Inventors: Masafumi Wakazono, Kanagawa (JP); Naoya Katoh, Chiba (JP)

(73) Assignee: Sony Corporation (JP)

( * ) Notice: Subject to any disclaimer, the term of this patent is extended or adjusted under 35 U.S.C. 154(b) by 1024 days.

(21) Appl. No.: 12/590,099

(22) Filed: Nov. 2, 2009

(65) Prior Publication Data

US 2010/0128332 A1    May 27, 2010

(30) Foreign Application Priority Data

Nov. 27, 2008    (JP) .............................. P2008-302340

(51) Int. Cl.
    *G03F 3/08*    (2006.01)
(52) U.S. Cl.
    USPC ......................................................... 358/521
(58) Field of Classification Search
    None
    See application file for complete search history.

(56) References Cited

U.S. PATENT DOCUMENTS

| 5,394,194 A | * | 2/1995 | Izawa et al. ................... 348/672 |
| 5,818,604 A | * | 10/1998 | Delabastita et al. .......... 358/3.19 |
| 6,965,416 B2 | | 11/2005 | Tsuchiya et al. |
| 2004/0175054 A1 | * | 9/2004 | Ogata et al. ................... 382/274 |
| 2007/0053607 A1 | | 3/2007 | Mitsunaga |
| 2008/0123950 A1 | | 5/2008 | Matsushita et al. |

FOREIGN PATENT DOCUMENTS

| JP | 2001-275015 A | 10/2001 |
| JP | 2006319781 A | 11/2006 |
| JP | 2007-049540 A | 2/2007 |
| JP | 2007174243 A | 7/2007 |
| JP | 2008-113222 A | 5/2008 |
| JP | 2008-131529 A | 6/2008 |
| JP | 2008-148180 A | 6/2008 |
| WO | 2006137216 A1 | 12/2006 |

OTHER PUBLICATIONS

Office Action from Japanese Application No. 2008-302340, dated Sep. 16, 2010.

* cited by examiner

*Primary Examiner* — Jeremiah A Bryar
(74) *Attorney, Agent, or Firm* — Lerner, David, Littenberg, Krumholz & Mentlik, LLP

(57) ABSTRACT

An image signal processing apparatus includes the following elements. A control unit determines a gradation correction characteristic representing a conversion characteristic for correcting brightness of an input frame. A separation unit separates the determined gradation correction characteristic into a representative gradation correction value representing an amount of correction for a representative value of a main subject and a remaining gradation correction characteristic obtained by removing the representative gradation correction value from the gradation correction characteristic. A gain processing unit uniformly applies the separated representative gradation correction value to the frame as a gain. A noise reduction processing unit performs noise reduction processing on the frame to which the representative gradation correction value is applied. A gradation correction processing unit performs gradation correction processing on the frame for which the noise reduction processing has been performed using the separated remaining gradation correction characteristic.

8 Claims, 13 Drawing Sheets

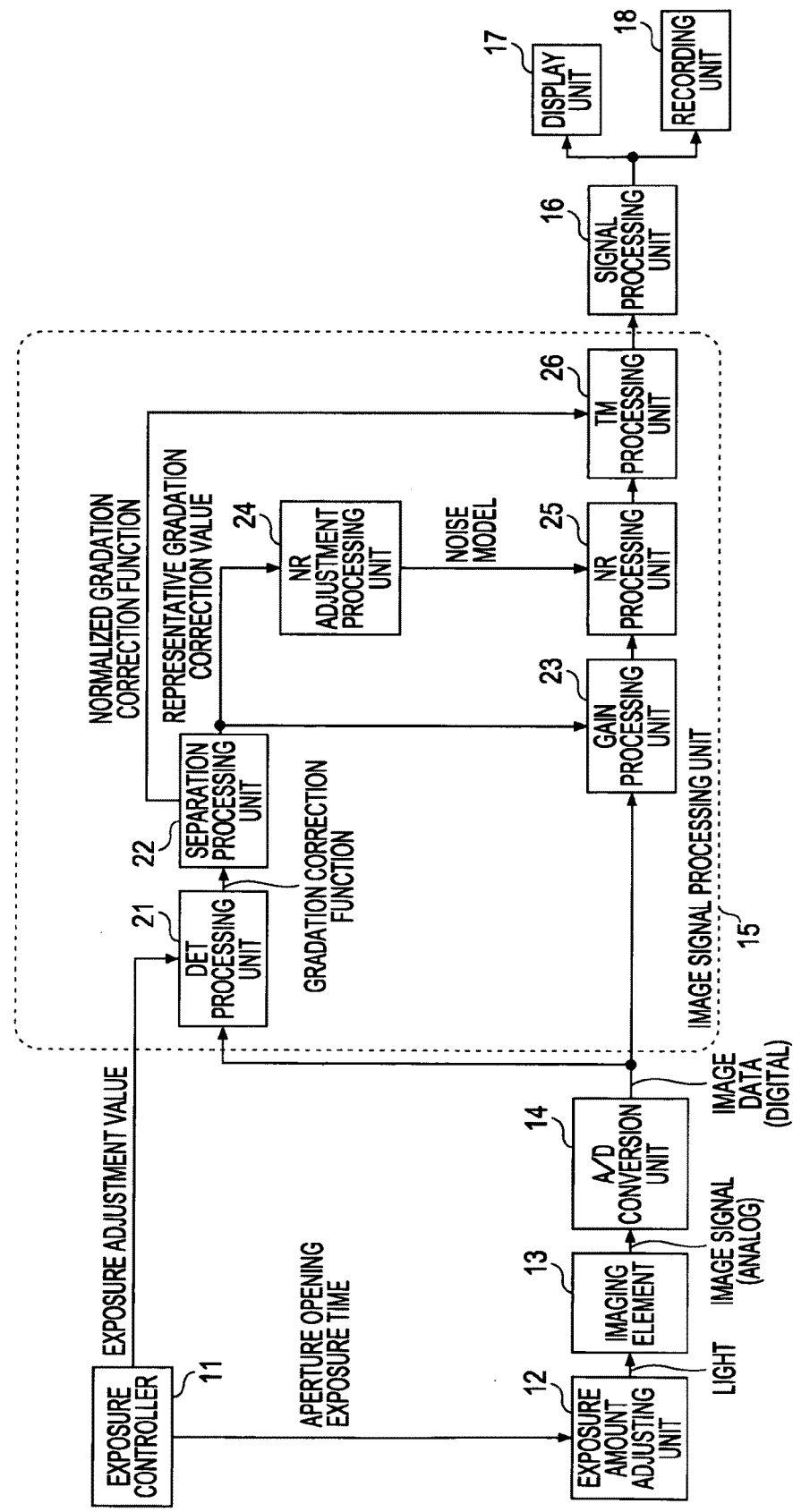

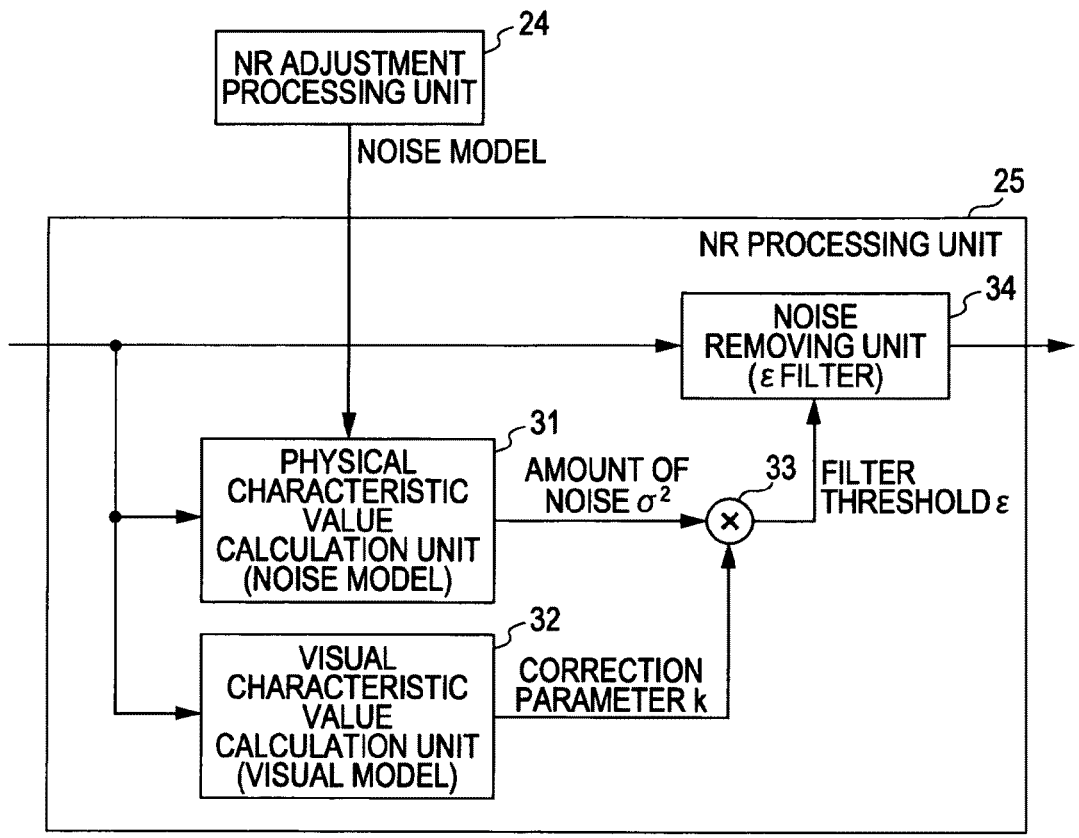

APPARATUS, METHOD AND PROGRAM FOR REDUCING DETERIORATION OF PROCESSING PERFORMANCE WHEN GRADUATION CORRECTION PROCESSING AND NOISE REDUCTION PROCESSING ARE PERFORMED

CROSS-REFERENCE TO RELATED APPLICATION

The present application claims priority from Japanese Patent Application No. JP 2008-302340 filed in the Japanese Patent Office on Nov. 27, 2008, the entire content of which is incorporated herein by reference.

BACKGROUND OF THE INVENTION

1. Field of the Invention

The present. invention relates to an image signal processing apparatus and method, and a program. More specifically, the present invention relates to an image signal processing apparatus and method, and a program in which an image with appropriately reduced noise can be obtained even when gradation correction processing and noise reduction processing are performed in combination.

The present invention relates to an image signal processing apparatus and method, and a program. More specifically, the present invention relates to an image signal processing apparatus and method, and a program in which an image with appropriately reduced noise can be obtained even when gradation correction processing and noise reduction processing are performed in combination.

2. Description of the Related Art

With the recent advancement of solid-state imaging technologies such as noise reduction or advancement of signal processing technologies, even digital cameras have been provided with capabilities to capture image data having a wide dynamic range. In this case, exposure control is performed so as to reduce the amount of exposure compared to that for image capture under normal conditions in order to prevent saturation from occurring in imaging elements (see, for example, Japanese Unexamined Patent Application Publication No. 2008-148180).

Imaging that is performed in the above control is hereinafter referred to as "wide DR imaging" and an image that is captured under the above control is hereinafter referred to as a "wide DR image".

Wide DR images are uniformly darker than images captured under normal conditions. Thus, when a wide DR image is output, inside a camera, gradation correction processing is performed in digital signal processing so as to optimize the brightness of the main subject. Examples of the gradation correction processing generally include tone curve processing and dynamic range compression processing.

The gradation correction processing is performed in such a manner that the image of the main subject can appear brighter. This operation has the effect of increasing the width of the signal which is assigned to the main subject. In the digital signal processing, therefore, signal continuity (the smoothness of change in level) for the corresponding portion is deteriorated.

In digital cameras, noise reduction processing (hereinafter referred to as "NR processing") is generally performed in order to reduce noise in image data. In the NR processing, a noise component is removed from image data in consideration of a noise model indicating the relationship between the input level and the noise component (see, for example, Japanese Unexamined Patent Application Publication No. 2008-131529) or human visual characteristics (see, for example, Japanese Unexamined Patent Application Publication No. 2008-113222).

The NR processing is generally performed using, for example, a non-linear smoothing filter such as a bilateral filter. The process for smoothing a digital signal has the effect of improving the continuity (resolution) in level by averaging a plurality of pieces of data including quantization error and noise. Therefore, the NR processing also has a nature of improved signal continuity of an input image as well as noise elimination or reduction.

SUMMARY OF THE INVENTION

When both the gradation correction processing and NR processing described above are performed on a wide DR image, the performance of the processing may be reduced as below regardless of which the gradation correction processing or the NR processing is performed first.

When the gradation correction processing is performed first and then the NR processing is performed, due to the influence of the gradation correction processing, noise may be amplified or the amplitude of the original signal may be suppressed. Therefore, it is difficult to distinguish between noise and the original signal, resulting in a risk of the performance of the NR processing being reduced. In an image obtained after the gradation correction processing, furthermore, due to its influence, no noise model is established. Therefore, it is difficult to appropriately perform the NR processing.

On the other hand, when the NR processing is performed first and then the gradation correction processing is performed, there is a risk of the performance of the NR processing being reduced because the human visual characteristics may not necessarily be correctly reflected due to the low brightness of the main subject since no gradation correction has been performed. In addition, since the gradation correction processing allows the main subject to be corrected so as to increase the brightness thereof, the continuity in the level of the subject may be deteriorated.

It is therefore desirable to prevent or reduce deterioration of processing performance when gradation correction processing and noise reduction processing are performed in combination.

In an embodiment of the present invention, an image signal processing apparatus includes the following elements. A control unit is configured to determine a gradation correction characteristic representing a conversion characteristic for correcting brightness of an input frame. A separation unit is configured to separate the gradation correction characteristic determined by the control unit into a representative gradation correction value representing an amount of correction for a representative value of a main subject and a remaining gradation correction characteristic obtained by removing the representative gradation correction value from the gradation correction characteristic. A gain processing unit is configured to uniformly apply the representative gradation correction value separated by the separation unit to the frame as a gain. A noise reduction processing unit is configured to perform noise reduction processing on the frame to which the representative gradation correction value is applied by the gain processing unit. A gradation correction processing unit is configured to perform gradation correction processing on the frame for which the noise reduction processing has been performed by the noise reduction processing unit using the remaining gradation correction characteristic separated by the separation unit.

The remaining gradation correction characteristic may be a normalized gradation correction function obtained by normalizing the gradation correction characteristic with respect to the representative value of the main subject.

The gradation correction processing unit can perform tone curve processing as the gradation correction processing.

The gradation correction processing unit can perform dynamic range compression processing as the gradation correction processing.

The gradation correction processing unit can perform shading correction processing as the gradation correction processing.

The image signal processing apparatus may further include a parameter setting unit configured to set a parameter of a noise model of the noise reduction processing using the representative gradation correction value separated by the separation unit.

In another embodiment of the present invention, an image signal processing method includes the steps of determining a gradation correction characteristic representing a conversion characteristic for correcting brightness of an input frame; separating the determined gradation correction characteristic into a representative gradation correction value representing an amount of correction for a representative value of a main subject and a remaining gradation correction characteristic obtained by removing the representative gradation correction value from the gradation correction characteristic; uniformly applying the separated representative gradation correction value to the frame as a gain; performing noise reduction processing on the frame to which the representative gradation correction value is applied; and performing gradation correction processing on the frame for which the noise reduction processing has been performed using the separated remaining gradation correction characteristic.

In another embodiment of the present invention, a program for causing a computer to execute a process including the steps of determining a gradation correction characteristic representing a conversion characteristic for correcting brightness of an input frame; separating the determined gradation correction characteristic into a representative gradation correction value representing an amount of correction for a representative value of a main subject and a remaining gradation correction characteristic obtained by removing the representative gradation correction value from the gradation correction characteristic; uniformly applying the separated representative gradation correction value to the frame as a gain; performing noise reduction processing on the frame to which the representative gradation correction value is applied; and performing gradation correction processing on the frame for which the noise reduction processing has been performed using the separated remaining gradation correction characteristic.

According to an embodiment of the present invention, gradation correction processing and noise reduction processing can be performed in combination. According to an embodiment of the present invention, furthermore, deterioration of processing performance can be prevented or reduced when gradation correction processing and noise reduction processing are performed in combination.

BRIEF DESCRIPTION OF THE DRAWINGS

FIG. 1 is a block diagram illustrating an example configuration of a digital camera according to an embodiment of the present invention;

FIG. 2 is a diagram illustrating an example configuration of an NR processing unit illustrated in FIG. 1;

FIG. 3 is a diagram illustrating an example of a conversion table;

DESCRIPTION OF THE PREFERRED EMBODIMENTS

Figure 4:
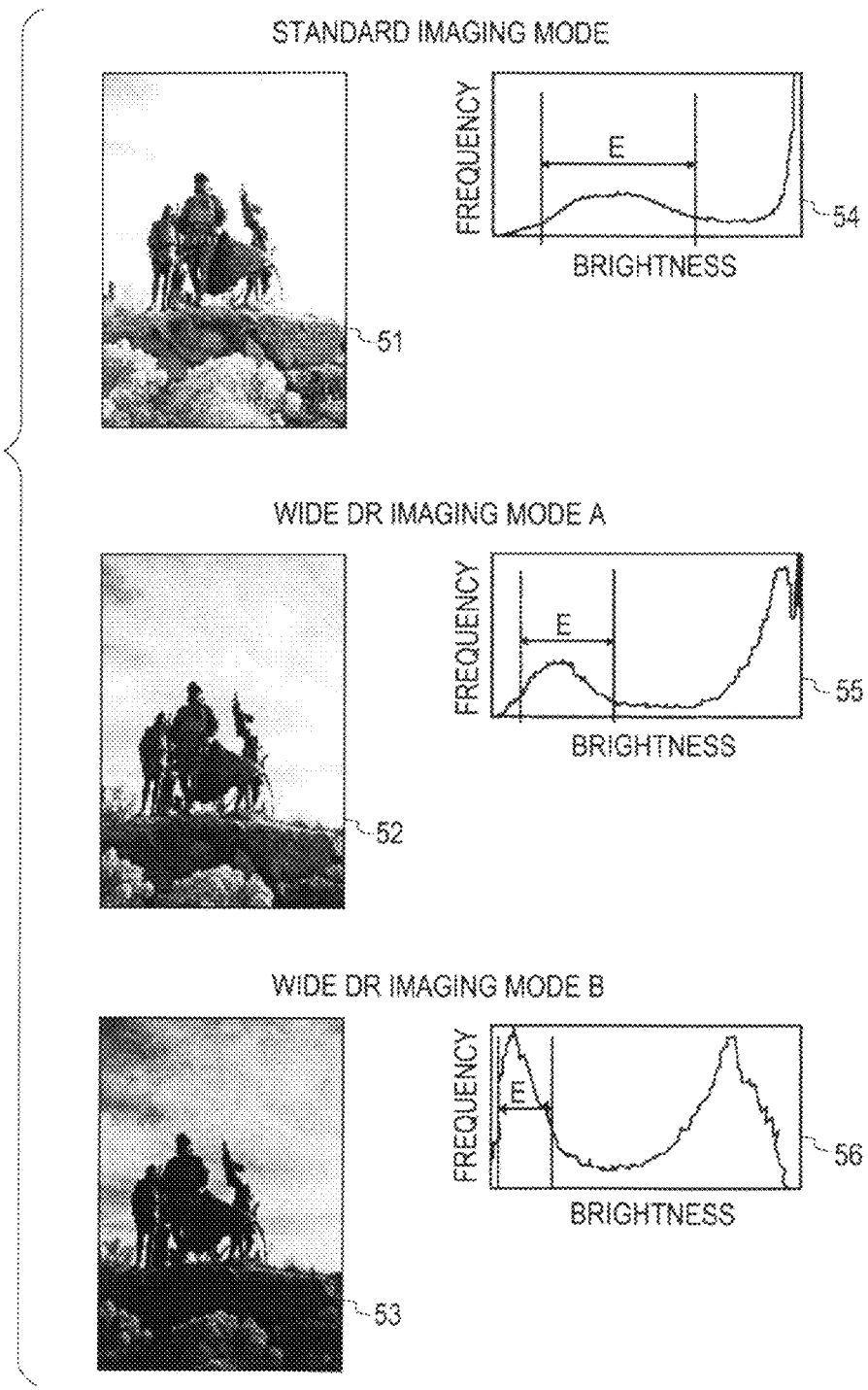
FIG. 4 is a diagram illustrating images of image data captured in imaging modes.

Image signal processing apparatuses according to embodiments of the present invention will now be described in the context of a digital camera according to a first embodiment and a personal computer according to a second embodiment.

First Embodiment

FIG. 1 is a block diagram illustrating an example configuration of a digital camera 1 serving as an image signal processing apparatus according to an embodiment of the present invention.

In the example illustrated in FIG. 1, the digital camera 1 includes an exposure controller 11, an exposure amount adjusting unit 12, an imaging element 13, an analog-to-digital (A/D) conversion unit 14, an image signal processing unit 15, a signal processing unit 16, a display unit 17, and a recording unit 18.

The exposure controller 11 and the exposure amount adjusting unit 12 are configured to perform exposure control. The exposure controller 11 sets an exposure adjustment value (that is, a control value for the exposure amount adjusting unit 12) so as to obtain an appropriate amount of exposure of the imaging element 13 in accordance with the luminance distribution of the subject and the imaging mode of the digital camera 1. The exposure controller 11 outputs the exposure adjustment value to a detection (DET) processing unit 21. The exposure amount adjusting unit 12 adjusts the amount of exposure of the imaging element 13 using the control value output from the exposure controller 11, and performs exposure. Examples of the control value generally include the aperture opening, the exposure time, and the density of a neutral density (ND) filter.

The imaging element 13 may be configured by, for example, a solid-state imaging element such as a charge coupled device (CCD) or complementary metal oxide semiconductor (CMOS) sensor. The imaging element 13 converts light incident from the subject or the like through an optical block (not illustrated) such as a lens into an analog signal.

The A/D conversion unit 14 quantizes the image signal converted into an analog signal by the imaging element 13 to produce digital image data. The image data is output from the A/D conversion unit 14 to the DET processing unit 21 and a gain processing unit 23 of the image signal processing unit 15.

The image signal processing unit 15 performs image signal processing on the image data output from the A/D conversion unit 14. Specifically, the image signal processing unit 15 performs gradation correction so as to obtain the desired brightness of the main subject in the image data (frame) output from the A/D conversion unit 14, and also performs noise reduction processing to reduce noise in the image data. In this case, the image signal processing unit 15 performs brightness gradation correction processing in substantially two separate stages before and after the noise reduction processing. For example, gradation correction processing is performed in the first stage so as to increase gradation and gradation correction processing is performed in the second stage so as to reduce gradation in a high-luminance portion. The noise reduction processing is hereinafter referred to appropriately as "NR processing" or "noise removal processing".

The image signal processing unit 15 includes the DET processing unit 21, a separation processing unit 22, the gain processing unit 23 configured to perform gradation correction processing in the first stage, a noise reduction (NR) adjustment processing unit 24, an NR processing unit 25, and a tone map (TM) (gradation correction) processing unit 26 configured to perform gradation correction processing in the second stage.

The DET processing unit 21 analyzes the image data output from the A/D conversion unit 14 to determine a gradation correction characteristic to be applied to the image data using the exposure adjustment value output from the exposure controller 11, and outputs the determined gradation correction characteristic to the separation processing unit 22. For example, the DET processing unit 21 determines a gradation correction function as an example of the gradation correction characteristic. The gradation correction function is a function that defines a conversion characteristic for optimizing the brightness of the image data as the relationship between the input and output brightness levels. For example, the gradation correction function may be determined so that the occurrence of over-exposure in a high-luminance portion can be reduced and the brightness of the main subject can be increased.

The separation processing unit 22 decomposes the gradation correction characteristic output from the DET processing unit 21 into a component necessary for the gain processing unit 23 to perform brightness gradation correction processing in the first stage and a component necessary for the TM processing unit 26 to perform brightness gradation correction processing in the second stage, and assigns each of the components to the corresponding unit. For example, when a gradation correction function is input as a gradation correction characteristic from the DET processing unit 21, the separation processing unit 22 decomposes the gradation correction function into a representative gradation correction value and a normalized gradation correction function that is a remaining gradation correction function obtained by subtracting the representative gradation correction value from the gradation correction function. Then, the separation processing unit 22 assigns the representative gradation correction value to the gain processing unit 23 and the normalized gradation correction function to the TM processing unit 26. The representative gradation correction value is also output to the NR adjustment processing unit 24.

The representative gradation correction value is a gain value obtained when the correction processing performed on the representative value (representative level value) of the main subject is represented by gain. The normalized gradation correction function is a gradation correction function that is normalized so that the input and output levels of the gradation correction function can be the same with respect to the representative value of the main subject.

The gain processing unit 23 performs brightness gradation correction processing in the first stage using the representative gradation correction value output from the separation processing unit 22. Specifically, the gain processing unit 23 corrects (adjusts) the image data output from the A/D conversion unit 14 so as to obtain uniform brightness using the representative gradation correction value output from the separation processing unit 22, and outputs the image data whose brightness has been corrected to the NR processing unit 25.

The NR adjustment processing unit 24 calculates a parameter of a noise model indicating the relationship between the input level and the noise component using the representative gradation correction value output from the separation processing unit 22, and sets the parameter in the noise model of the NR processing unit 25.

In the NR processing unit 25, for example, the noise removal processing disclosed in Japanese Unexamined Patent Application Publication No. 2008-113222 is performed. The NR processing unit 25 removes noise in the image data output from the gain processing unit 23 using the noise model set by the NR adjustment processing unit 24, and outputs a result to the TM processing unit 26. The removal of noise by the NR processing unit 25 includes reducing noise as well as perfectly removing noise.

The TM processing unit 26 performs brightness gradation correction processing in the second stage using the normalized gradation correction function output from the separation processing unit 22. Specifically, the TM processing unit 26 performs gradation correction on the image data output from the NR adjustment processing unit 24 using the normalized gradation correction function output from the separation processing unit 22, and outputs the gradation-corrected image data to the signal processing unit 16. The gradation correction may be implemented using tone curve processing, dynamic range compression processing, shading processing, or the like. The gradation correction will be described hereinafter in the context of tone curve processing by way of example.

The signal processing unit 16 performs signal processing on the image data output from the TM processing unit 26, such as displaying an image on the subsequent display unit 17 or converting the image data into image data suitable for recording on the recording unit 18, and outputs resulting image data to the corresponding display unit 17 or recording unit 18. In the signal processing unit 16, signal processing in which, for example, signal format conversion such as gamma conversion or YCbCr conversion and color conversion processing using a look up table (LUT) are combined is performed.

The display unit 17 may be configured by, for example, a liquid crystal display (LCD) panel or the like, and is configured to display an image corresponding to the image data output from the signal processing unit 16. The recording unit 18 is configured to record the image data output from the signal processing unit 16 onto a recording medium (not illustrated) such as an optical disk or a magnetic disk.

FIG. 2 is a diagram illustrating an example configuration of the NR processing unit 25.

The NR processing unit 25 illustrated in FIG. 2 includes a physical characteristic value calculation unit 31, a visual characteristic value calculation unit 32, a threshold determination unit 33, and a noise removing unit 34.

The image data output from the gain processing unit 23 is input to the physical characteristic value calculation unit 31, the visual characteristic value calculation unit 32, and the noise removing unit 34.

The physical characteristic value calculation unit calculates an amount of noise (physical characteristic value) σ2, which is a value dependent on the luminance of the input image data, using the noise model whose parameters are set by the NR adjustment processing unit 24, and outputs the amount of noise to the threshold determination unit 33.

The visual characteristic value calculation unit 32 determines colors R, G, and B of the image indicated by the input image data, and calculates a correction parameter (visual characteristic value) k, which is a coefficient for correcting the physical characteristic value, using a visual model. The visual characteristic value calculation unit 32 outputs the correction parameter to the threshold determination unit 33.

The visual model may be configured by, for example, a color-correction value conversion table that is created in consideration of the human visual characteristics, which will be described below with reference to FIG. 3.

The threshold determination unit 33 calculates a filter threshold ε, which is used for the noise removing unit 34 to perform noise removal processing, using the amount of noise σ2 output from the physical characteristic value calculation unit 31 and the correction parameter k output from the visual characteristic value calculation unit 32, and outputs the calculated filter threshold ε to the noise removing unit 34. The threshold determination unit 33 is configured using, for example, a multiplier, and is configured to multiply the amount of noise σ2 output from the physical characteristic value calculation unit 31 by the correction parameter k output from the visual characteristic value calculation unit 32 to produce a value kσ2 and output the value kσ2 to the noise removing unit 34 as a filter threshold ε. The filter threshold ε is determined in this manner, thus allowing noise removal processing using an appropriate threshold which takes the physical characteristics of noise and the human visual characteristics into consideration.

The noise removing unit 34 executes, for example, ε filter-based noise removal on the input image data using the filter threshold ε output from the threshold determination unit 33, and outputs the image data subjected to the noise removal processing to the subsequent TM processing unit 26. The noise removing unit 34 can also use a method other than that using an ε filter to remove noise.

FIG. 3 is a diagram illustrating an example configuration of a conversion table used as a visual model.

The conversion table is a conversion table in which colors, (r, g, b) values, and correction parameters k are associated with one another, and is configured to convert each of the values of colors R, G, and B of an image into a correction parameter k.

In the conversion table, green color, (r, g, b)=(100, 170, 100), and the correction parameter k=2.0 are associated with one another, and yellow color, (r, g, b)=(240, 200, 60), and the correction parameter k=2.0 are associated with one another. Further, blue color, (r, g, b)=(90, 90, 200), and the correction parameter k=3.0 are associated with one another, and red color, (r, g, b)=(200, 50, 70), and the correction parameter k=3.0 are associated with one another. Further, flesh color, (r, g, b)=(220, 170, 170), and the correction parameter k=3.0 are associated with one another, and other colors and the parameter k=2.5 are associated with each other.

The visual characteristic value calculation unit 32 determines the colors R, G, and B of the image indicated by the input image data, and selects the value that is the closest to each of the determined values of the colors R, G, and B from among the (r, g, b) values in the conversion table. Then, the visual characteristic value calculation unit 32 selects the correction parameter k corresponding to the selected (r, g, b) values from the conversion table, and outputs the selected correction parameter k to the threshold determination unit 33.

The selection of the value that is the closest to each of the values of the colors R, G, and B from among the (r, g, b) values in the conversion table is performed based on a color space distance (vector) of each value.

The imaging modes of the digital camera 1 will now be described with reference to FIG. 4.

The digital camera 1 has imaging modes including at least a wide DR imaging mode in which an image having a wide dynamic range is captured and a standard imaging mode in which an image having a non-wide dynamic range, or a standard dynamic range, is captured. In the examples illustrated in FIG. 4, two types of wide DR imaging modes which employ different exposure adjustment methods, namely, a wide DR imaging mode A and a wide DR imaging mode B, are provided.

When the imaging mode of the digital camera 1 is the wide DR imaging mode A, the exposure controller 11 sets an exposure adjustment value using, for example, a method for performing exposure adjustment so as not to extremely reduce the amount of exposure of the main subject while preventing the occurrence of over-exposure on the imaging element 13, which is disclosed in Japanese Unexamined Patent Application Publication No. 2008-148180.

When the imaging mode of the digital camera 1 is the wide DR imaging mode B, the exposure controller 11 sets an exposure adjustment value using, for example, a method for performing exposure adjustment so as to prevent the occurrence of any over-exposure on the imaging element 13.

Any specific exposure adjustment methods may be used, including, but not limited to, the wide DR imaging mode A and the wide DR imaging mode B described above. An exposure adjustment value for image capture in a DR imaging modes has lower exposure than that for image capture in a standard mode.

In the examples illustrated in FIG. 4, images 51 to 53 of image data obtained by capturing images in the imaging modes described above and histograms 54 to 56 thereof are illustrated. Specifically, in the upper part of FIG. 4, the image 51 of the image data obtained by capturing an image in the standard imaging mode, and the histogram 54 thereof are illustrated. In the middle part of FIG. 4, the image 52 of the image data obtained by capturing an image in the wide DR imaging mode A, and the histogram 55 thereof are illustrated. In the lower part of FIG. 4, the image 53 of the image data obtained by capturing an image in the wide DR imaging mode B, and the histogram 56 thereof are illustrated.

In the histograms 54 to 56, the ordinate represents frequency and the abscissa represents brightness (luminance), where the farther to the right, the higher the brightness. Further, the main subject in the images 51 to 53 is a person in the center of the screen, and a range E in the histograms 54 to 56 indicates the brightness distribution of the main subject. The same applies to the other histograms although it is not specifically stated herein.

In image capture in the standard imaging mode, as indicated by the range E in the histogram 54, the main subject has sufficient brightness, which is preferable. In the high-luminance sky portion in the upper part of the image 51, however, over-exposure occurs and the brightness of the subject (sky portion) is not reflected in the signal.

In image capture in the wide DR imaging mode A, on the other hand, an image is captured with exposure which is lower than that in image capture in the standard imaging mode. In the image capture in the wide DR imaging mode A, since the exposure is lower than that in the image capture in the standard imaging mode, the brightness of the sky portion of the image 52 is substantially reflected in the signal, as compared with that of the image 51 in the standard imaging mode.

In image capture in the wide DR imaging mode B, an image is captured with exposure which is further lowered than that in the image capture in the wide DR imaging mode A. In the image capture in the wide DR imaging mode B, since the exposure is further lower than that in the image capture in the wide DR imaging mode A, the brightness of the sky portion of the image 53 is completely reflected in the signal. However, in the image capture in either wide DR imaging mode, due to the lowered exposure, as indicated by the ranges E in the histograms 55 and 56, the brightness of the main subject is low.

Figure 5:
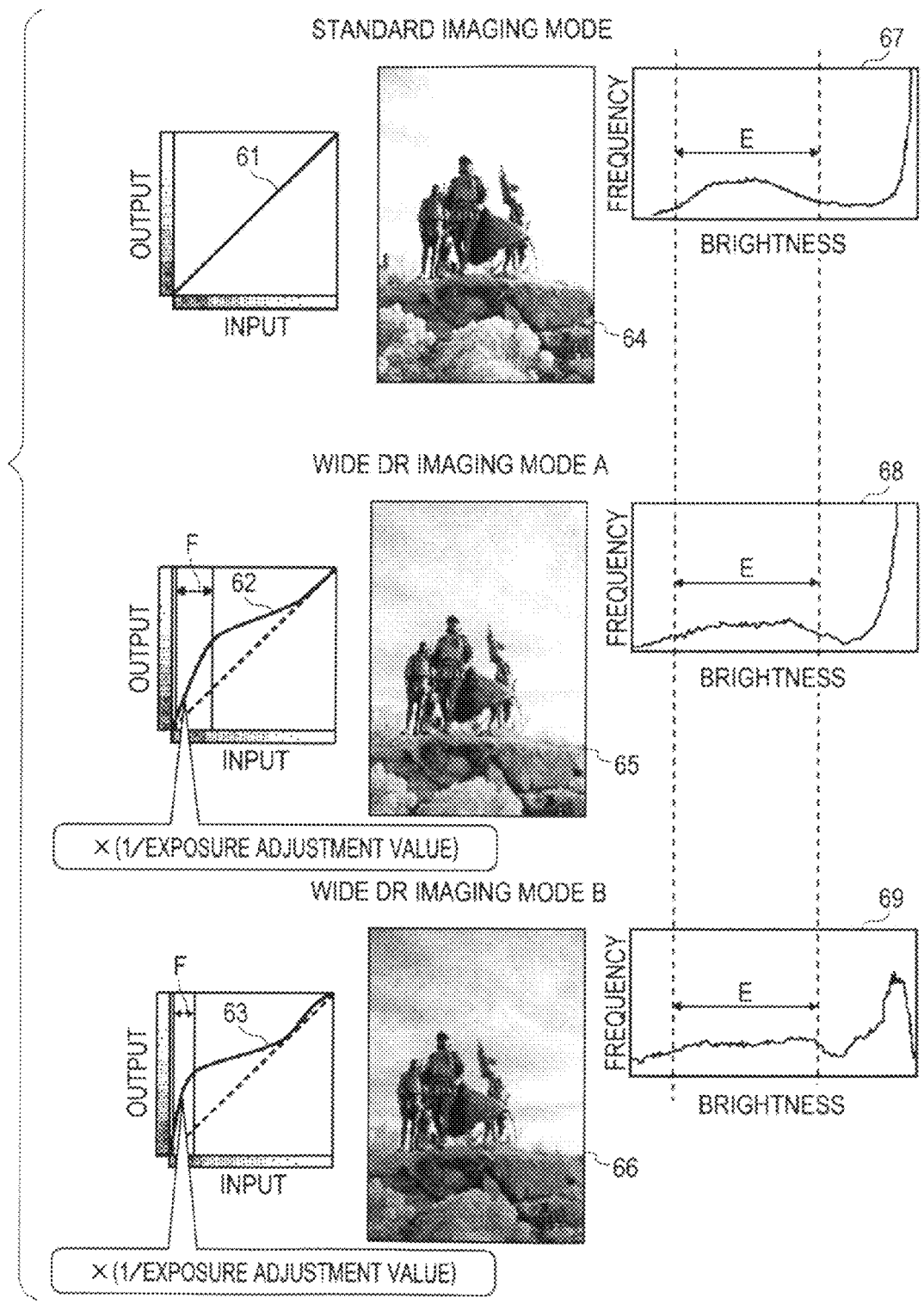
FIG. 5 is a diagram illustrating examples of gradation correction characteristics of the image data illustrated in FIG. 4.

FIG. 5 is a diagram illustrating examples of the gradation correction characteristic of the image data illustrated in FIG. 4. In the examples illustrated in FIG. 5, graphs for tone curves 61 to 63 representing gradation correction characteristics of image data obtained by capturing images in the individual imaging modes illustrated in FIG. 4, images 64 to 66 corresponding to pieces of image data obtained after gradation correction based on the tone curves 61 to 63, and histograms 67 to 69 of the images 64 to 66 are illustrated.

In the graphs for the tone curves 61 to 63, the abscissa represents input level, where the farther to the right, the higher the luminance. The ordinate represents output level, where the closer to the upper end the output level, the higher the luminance. The same applies to other graphs for tone curves although it is not specifically stated herein.

As in the images 51 to 53, the main subject in the images 64 to 66 is a person in the center of the screen. Further, a range F in the graphs for the tone curves 62 and 63 indicates the brightness range of the main subject, and a range E in the histograms 67 to 69 indicates the brightness distribution of the main subject.

In the DET processing unit 21, a gradation correction characteristic for correcting the brightness of the image data obtained by capturing an image is determined. The gradation correction characteristic is a processing characteristic for correcting the brightness of the main subject, which is low because of the image capture in a wide DR imaging mode, while maintaining the signal of the high-luminance portion, and may be, for example, a gradation correction function represented by the tone curve 62 or 63.

The gradation correction characteristic may be determined using any method. The DET processing unit 21 determines a gradation correction characteristic so that, for example, the occurrence of over-exposure in a high-luminance portion can be prevented and the brightness of the main subject can be increased. Specifically, within the brightness range of the main subject which is indicated by the range F in the graph for the tone curve 62, the DET processing unit 21 determines a gradation correction characteristic so that the exposure lower than that in the standard imaging mode can be offset (canceled) by the exposure adjustment value of the exposure controller 11. Beyond the range F of the brightness, the DET processing unit 21 determines a gradation correction characteristic so that the amount of correction can be gradually reduced.

Similarly, within the brightness range of the main subject which is indicated by the range F in the graph for the tone curve 63, the DET processing unit 21 determines a gradation correction characteristic so that the exposure further lower than that in the wide DR imaging mode A can be offset by the exposure adjustment value of the exposure controller 11. Beyond the range F of the brightness, the DET processing unit 21 determines a gradation correction characteristic so that the amount of correction can be gradually reduced. Therefore, the gradient of the tone curve 63 within the range F is sharper than the gradient of the tone curve 62 within the range F. In the graphs for the tone curves 62 and 63, "x(1/exposure adjustment value)" represents the offset of the exposure adjustment value.

With the use of the tone curve (gradation correction characteristic) 62, the low-luminance portion of the image 52 illustrated in FIG. 4 is corrected so as to increase the brightness. That is, correction can be performed so that, as indicated by the image 65 and the histogram 68, the main subject in the image 52 illustrated in FIG. 4 can have optimum brightness (for example, brightness equivalent to the brightness indicated by the image 64 and the range E in the histogram 67 in the standard imaging mode).

Similarly, with the use of the tone curve (gradation correction characteristic) 63, the low-luminance portion of the image 53 illustrated in FIG. 4 is corrected so as to increase the brightness. That is, correction can be performed so that, as indicated by the image 66 and the histogram 69, the main subject in the image 53 illustrated in FIG. 4 can have optimum brightness (for example, brightness equivalent to the brightness indicated by the image 64 and the range E in the histogram 67 in the standard imaging mode).

Image data obtained by capturing an image in the standard imaging mode may not necessarily be subjected to gradation correction by the image signal processing unit 15. In the examples illustrated in FIG. 5, however, for comparison with image data obtained by capturing an image in the wide DR imaging modes, the tone curve 61, the image 64, and the histogram 67 are illustrated. Therefore, the tone curve 61 illustrated in FIG. 5 is linear, the image 64 obtained after the gradation correction matches the image 51 illustrated in FIG. 4, and the histogram 67 obtained after the gradation correction matches the histogram 54 illustrated in FIG. 4.

The details of the process of the image signal processing unit 15 will now be described with reference to FIG. 6. In the example illustrated in FIG. 6, for the convenience of description, the NR adjustment processing unit 24 is not illustrated. The separation processing unit 22 includes a representative value detection unit 71 and a gradation correction normalization unit 72.

Figure 6:
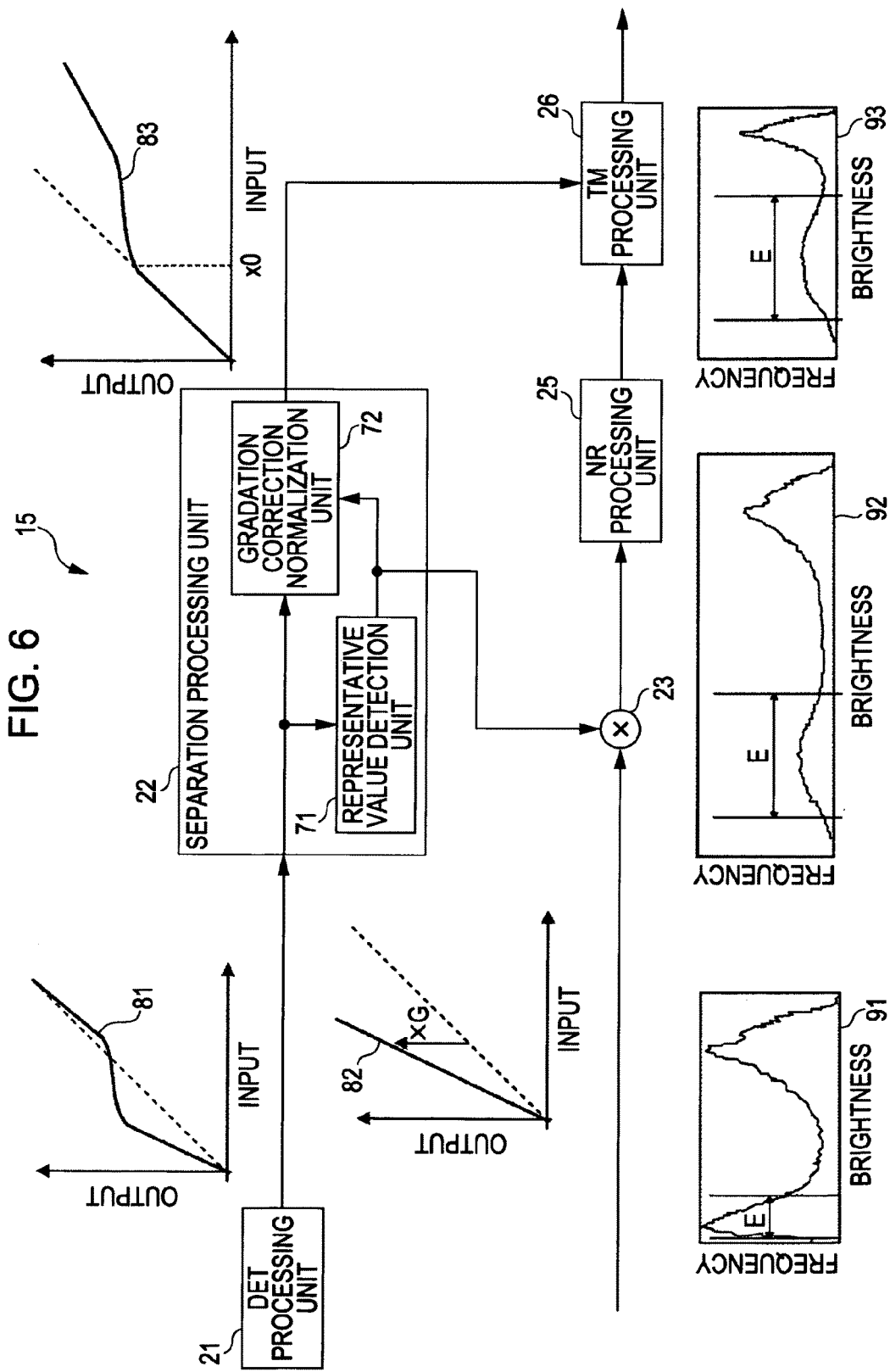
FIG. 6 is a diagram describing a process of an image signal processing unit.

In the example illustrated in FIG. 6, furthermore, graphs for tone curves 81 to 83 and histograms 91 to 93 are illustrated. The tone curve 81 represents a gradation correction characteristic determined by the DET processing unit 21, and, for the purpose of description, the tone curve 82 is a tone curve expression of input and output characteristics of the process of uniformly applying a representative gradation correction value G detected by the representative value detection unit 71. The tone curve 83 represents a normalized gradation correction characteristic determined by the gradation correction normalization unit 72. The histograms 91 to 93 are a histogram of image data input to the gain processing unit 23, a histogram of image data obtained after gain processing, and a histogram of image data obtained after gradation correction, respectively.

For example, data of the gradation correction characteristic represented by the tone curve 81 is input from the DET processing unit 21 to the representative value detection unit 71 and the gradation correction normalization unit 72.

The representative value detection unit 71 detects a representative gradation correction value G, which is a value representing the amount of correction to be performed on the representative value of the main subject, in the gradation correction characteristic determined by the DET processing unit 21. The representative gradation correction value G is a numerical value represented by gain. As an example, when the gradation correction characteristic is represented by function y=f(x), the representative gradation correction value G is determined by Equation (1) below using the input/output ratio f(x)/x (that is, the gradient of the function y=f(x)):

$$G = \arg\max(f(x)/x) \qquad (1)$$

where when the brightness range of the main subject is already given, "x ∈ the brightness range of the main subject" is obtained. When the brightness of the main subject is already given by, for example, a detection thereof and is a certain value x0 (that is, when the representative value of the main subject is x0), G=f(x0)/x0 is obtained. Furthermore, the representative gradation correction value G which is determined when the brightness of the main subject has a range may be determined using, in addition to the maximum value of f(x)/x within this range, for example, the average value of f(x)/x. In addition, when the brightness of the main subject is unknown, the maximum value of f(x)/x is used.

In the detection process for the representative gradation correction value G, an element for correcting the brightness of the main subject is detected.

The gradation correction normalization unit 72 removes the representative gradation correction value G detected by the representative value detection unit 71 from the gradation correction characteristic determined by the DET processing unit 21 to determine the remaining component. That is, the gradation correction normalization unit 72 normalizes the gradation correction characteristic determined by the DET processing unit 21 with respect to the main subject, and determines a new gradation correction characteristic. For example, when the gradation correction characteristic is represented by function y=f(x), a function f'(x) representing a normalized gradation correction characteristic, which is a new gradation correction characteristic, is determined by Equation (2) below using the representative gradation correction value G detected by the representative value detection unit 71:

$$f'(x) = f(x \times G)/G \qquad (2)$$

In Equation (2), the x axis is multiplied by G in order to offset the increase in level width based on the representative gradation correction value G, which is performed by the gain processing unit 23 described below, and the y axis is multiplied by 1/G in order to recover the original brightness from that increased using the representative gradation correction value G. That is, as indicated by the tone curve 83, Equation (2) by which f'(x) is determined is an expression for converting the gradation correction characteristic into a linear line around the main subject x0, namely, an expression for normalizing the gradation correction characteristic f(x). Therefore, the detection of the representative gradation correction value G is equivalent to the detection of a constant for normalization.

Accordingly, the separation processing unit 22 decomposes the gradation correction characteristic represented by the tone curve 81 into the gain G represented by the tone curve 82, which is uniform for frames, and the normalized gradation correction characteristic represented by the tone curve 83, and assigns the gain G and the normalized gradation correction characteristic to the gain processing unit 23 and the TM processing unit 26, respectively.

That is, the representative gradation correction value G detected by the representative value detection unit 71 is output to the gain processing unit 23, and the normalized gradation correction characteristic determined by the gradation correction normalization unit 72 is output to the TM processing unit 26. The representative gradation correction value G is also output to the NR adjustment processing unit 24 which is not illustrated in the example illustrated in FIG. 6. The details of the process performed in the NR adjustment processing unit 24 will be described below with reference to FIG. 7.

As indicated by the tone curve 82, the gain processing unit 23 uniformly applies the gain (representative gradation correction value) G to the input image data. Thus, as indicated in the histogram 92, the axis for brightness (abscissa) is stretched by the amount of the gain, resulting in an increase in level width of the signal of the image. Therefore, the brightness distribution of the main subject, which is dark as indicated by the range E in the histogram 91 before the application of the representative gradation correction value G, is corrected so that, as indicated by the range E in the histogram 92, the brightness can be increased in accordance with that of the main subject.

The NR processing unit 25 performs NR processing on the image data obtained from the gain processing unit 23. At this time, the brightness of the image data has already been adjusted by the gain processing unit 23, and a condition for allowing the visual model described above with reference to FIG. 2 to operate correctly has already been established. Thus, the NR processing unit 25 can perform optimum NR processing for the main subject.

The TM processing unit 26 performs gradation correction on the image data obtained after the NR processing using the normalized gradation correction characteristic represented by the tone curve 83. The normalized gradation correction characteristic is a normalized version of the representative value (for example, x0) of the main subject. Thus, the normalized gradation correction characteristic is linear up to the representative value x0 and has a nature that the brightness of a high-luminance portion is generally reduced in excess of the representative value x0. Therefore, the occurrence of overexposure can be prevented or reduced in the subsequent processing performed by signal processing unit 16.

In gradation correction, furthermore, a gradation correction characteristic obtained by normalizing the representative value of the main subject is used. Thus, as indicated in the histograms 92 and 93, the axis for brightness (level width of the image signal), which has been widened by the NR processing, can be narrowed without changing the width of the brightness range E of the main subject.

In the image signal processing unit 15, therefore, the two-stage brightness gradation correction processes are performed by the gain processing unit 23 and the TM processing unit 26, thereby correcting the brightness of the image data in accordance with the gradation correction characteristic determined by the DET processing unit 21.

That is, the TM processing unit 26 operates in cooperation with the gain processing unit 23 to achieve brightness correction of image data in accordance with the determination (gradation correction characteristic) of the DET processing unit 21.

Note that if the TM processing unit 26 is not provided, image data is input to the subsequent signal processing unit 16 with the entire image having been corrected so as to increase the brightness by the gain processing unit 23 in the brightness adjustment, resulting in a risk of over-exposure and insufficient effect of wide DR imaging.

Figure 7:
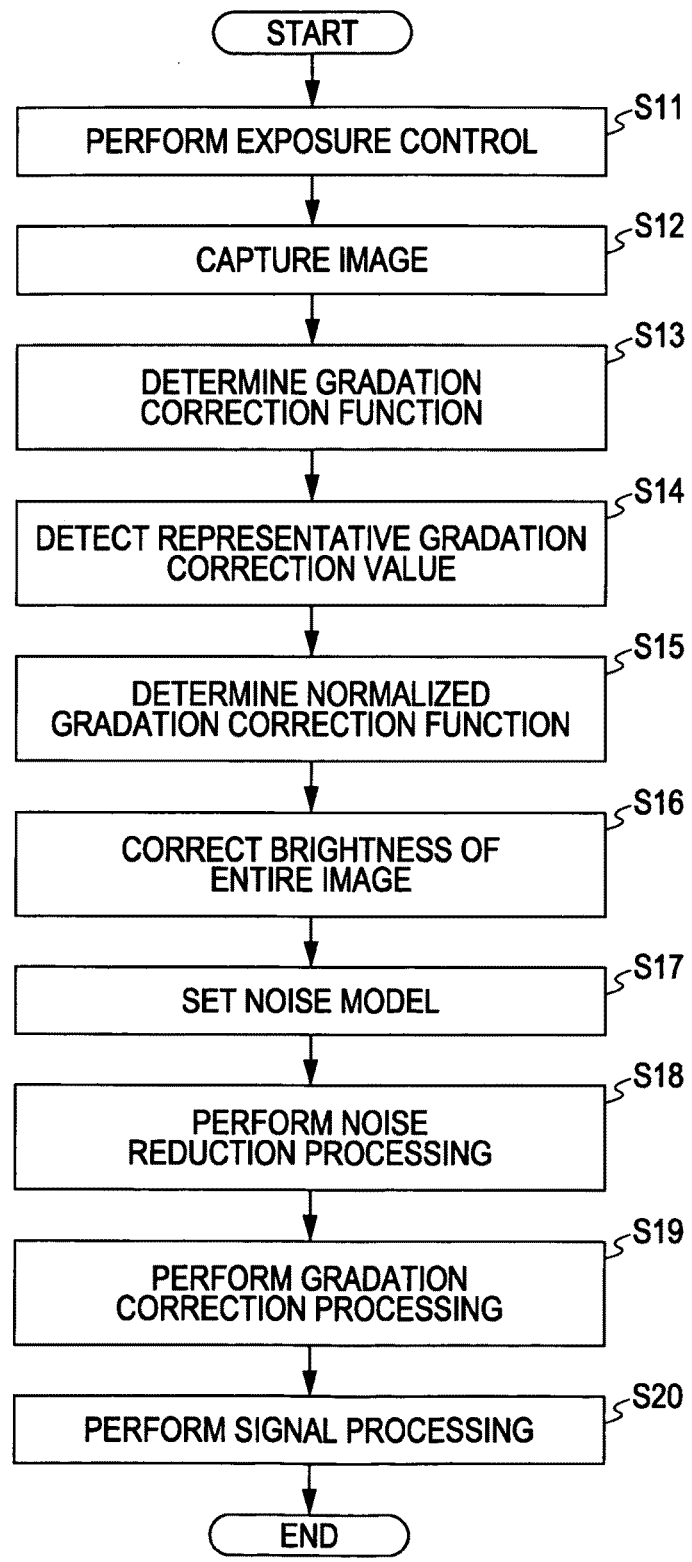
FIG. 7 is a flowchart describing a wide DR imaging process of the digital camera illustrated in FIG. 1.

The operation of the digital camera 1 will now be described. The wide DR imaging process of the digital camera 1 will be described with reference to a flowchart illustrated in FIG. 7. For example, when the power of the digital camera 1 is turned on by a user operation and the operation mode of the digital camera 1 is switched to a wide DR imaging mode, the process illustrated in FIG. 7 is initiated.

In step S11, the exposure controller 11 and the exposure amount adjusting unit 12 perform exposure control. That is, the exposure controller 11 confirms that the imaging mode of the digital camera 1 is a wide DR imaging mode. Then, for example, as described above with reference to FIG. 4, the exposure controller 11 sets an exposure adjustment value (a control value for the exposure amount adjusting unit 12) using a method for performing exposure adjustment so as not to extremely reduce the amount of exposure of the main subject while preventing the occurrence of over-exposure in the imaging element 13. The exposure amount adjusting unit 12 adjusts the amount of exposure of the imaging element 13 using the control value output from the exposure controller 11, and performs exposure.

In step S12, the imaging element 13 captures an image of a subject with exposure which has been adjusted by the exposure amount adjusting unit 12. That is, the imaging element 13 converts light incident from the subject or the like through an optical block (not illustrated) including a lens and the like into an analog signal.

The exposing light is converted into an analog signal by the imaging element 13, and is further quantized by the A/D conversion unit 14 into digital image data. The image data is output from the A/D conversion unit 14 to the DET processing unit 21 and gain processing unit 23 of the image signal processing unit 15.

In step S13, the DET processing unit 21 analyzes the image data output from the A/D conversion unit 14, and determines a gradation correction characteristic for correcting the brightness of the image data, that is, a gradation correction function representing the gradation correction characteristic, using the exposure adjustment value output from the exposure controller 11. As described above with reference to FIG. 5, the gradation correction function is determined so as to, for example, prevent over-exposure from occurring in the high-luminance portion and increase the brightness of the main subject. The gradation correction function determined by the DET processing unit 21 is output to the representative value detection unit 71 and gradation correction normalization unit 72 of the separation processing unit 22.

In step S14, the representative value detection unit 71 detects the representative gradation correction value G from the gradation correction function determined by the DET processing unit 21. As described above with reference to FIG. 6, for example, when the gradation correction characteristic is represented by function y=f(x), the representative gradation correction value G is determined by Equation (1) using the input/output ratio f(x)/x. The representative gradation correction value G detected by the representative value detection unit 71 is output to the gradation correction normalization unit 72, the gain processing unit 23, and the NR adjustment processing unit 24.

In step S15, the gradation correction normalization unit 72 determines the normalized gradation correction function f'(x), which represents the normalized gradation correction characteristic, as the remaining component determined by removing the representative gradation correction value G detected by the representative value detection unit 71 from the gradation correction function determined by the DET processing unit 21. As described above with reference to FIG. 6, for example, when the gradation correction characteristic is represented by function y=f(x), the normalized gradation correction function f'(x) is determined by Equation (2) using the representative gradation correction value G detected by the representative value detection unit 71.

The normalized gradation correction function f'(x) determined by the gradation correction normalization unit 72 is output to the TM processing unit 26.

In step S16, the gain processing unit 23 corrects the brightness of the entire image of the image data output from the A/D conversion unit 14 using the representative gradation correction value G determined by the representative value detection unit 71. That is, the gain processing unit 23 uniformly applies the gain (representative gradation correction value) G to the image data. Thus, the brightness of the entire image of the image data is corrected in accordance with the main subject. The image data for which the brightness has been corrected by the gain processing unit 23 is output to the NR processing unit 25.

In step S17, the NR adjustment processing unit 24 sets a noise model used by the NR processing unit 25 using the representative gradation correction value G detected by the representative value detection unit 71. For example, the noise model used by the NR processing unit 25 is defined by Equation (3) below, which is disclosed in Japanese Unexamined Patent Application Publication No. 2008-148180:

$$\sigma(x) = \sqrt{ax^2 + bx + c} \quad (3)$$

where parameter a defines a noise component that is substantially proportional to the input level, parameter b defines a noise component that is substantially proportional to the square root of the input level, and parameter c defines a noise component that is not dependent on the input level. In Equation (3), σ(x) denotes a noise model representing the variance of the amplitudes of noise signals and is a value which is physically calculated.

The parameters a, b, and c used in the noise model σ(x) represented by Equation (3) can be defined by Equations (4) to (6) below, respectively:

$$a = Va2 \quad (4)$$

$$b = gFD2 \cdot gsig2 \quad (5)$$

$$c = nri2 \cdot gsig2 \quad (6)$$

In Equation (4), parameter Va is a value indicating a characteristic of non-uniformity in opening (sensitivity) of the imaging element 13. The parameter Va is expressed as a ratio indicating the variation in the average values output from individual pixels when light is uniformly incident on a light receiving unit of the imaging element 13. More specifically, the parameter Va is calculated as the square root of a value obtained by subtracting the variation of the optical shot noise and floor noise from the variation of output values obtained when light is uniformly incident on the light receiving unit.

The parameter b corresponds to optical shot noise generated by the imaging element 13. In Equation (5), parameter gFD indicates the gain value generated when the amount of electrical charge of the imaging element 13 is converted into a voltage value.

The parameter c corresponds to floor noise which is to be dependent on the input level. In Equation (6), parameter nri indicates the converted noise value obtained by converting floor noise such as thermal noise, dark shot noise, and dark current variation into a signal level in an input unit of the analog processing system. Specifically, the parameter nri is calculated as the square root of variance of the output values for individual pixels obtained when the incident light on the light receiving unit of the imaging element 13 is blocked.

In Equations (5) and (6), parameter gsig indicates the total gain in the analog image signal transmission system and the A/D conversion system. The parameter gsig is represented by Equation (7) as follows:

$$g_{sig} = g_{CDS} \cdot g_a \cdot \frac{(1 \ll n_{bits}) - 1}{V_{fs}} \cdot g_d \qquad (7)$$

In Equation (7), parameter gCDS indicates the gain generated in a correlated double sampling (CDS) unit (not illustrated). Parameter ga indicates the gain generated in an analog amplifier (not illustrated) provided before the A/D conversion unit 14. Parameter nbits indicates the maximum number of bits of output data of the A/D conversion unit 14. Parameter Vfs indicates the allowed maximum value of the input voltage of the A/D conversion unit 14.

Parameter gd indicates the gain (representative gradation correction value) G applied to the image data obtained after A/D conversion by the gain processing unit 23 provided in the subsequent image signal processing unit 15.

That is, the NR adjustment processing unit 24 determines the shape of the function in Equation (3) by multiplying Equation (7) by the gain (representative gradation correction value) G and setting a parameter, and sets the determined shape in the noise model used by the NR processing unit 25. Thus, the effect of the gain (representative gradation correction value) G applied by the gain processing unit 23 on the parameter gd in Equation (7) can be taken into account.

In step S18, the NR processing unit 25 performs NR processing on the image data obtained from the gain processing unit 23. Specifically, in the processing of step S18, the physical characteristic value calculation unit 31 calculates the amount of noise σ2, which is a value dependent on the luminance of the image data output from the gain processing unit 23, using the noise model whose parameters are set in step S16, and outputs the amount of noise σ2 to the threshold determination unit 33.

The visual characteristic value calculation unit 32 determines colors R, G, and B of the image indicated by the image data output from the gain processing unit 23, and calculates a correction parameter k, which is a coefficient for correcting the physical characteristic value, using a visual model formed of the conversion table described above with reference to FIG. 3. The visual characteristic value calculation unit 32 outputs the correction parameter k to the threshold determination unit 33.

The threshold determination unit 33 multiplies the amount of noise σ2 output from the physical characteristic value calculation unit 31 by the correction parameter k output from the visual characteristic value calculation unit 32 to produce a value kσ2, and outputs the value kσ2 to the noise removing unit 34 as a filter threshold ε.

The noise removing unit 34 executes, for example, ε filter-based noise removal on the image data output from the gain processing unit 23 using the filter threshold ε output from the threshold determination unit 33, and outputs the image data subjected to the noise removal processing to the subsequent TM processing unit 26.

Accordingly, in the NR processing unit 25, a filter threshold ε is determined by multiplying the amount of noise σ2 based on the noise model by the correction parameter k based on the visual model. Therefore, since the brightness of the input image data has been adjusted by the gain processing unit 23, the visual model can correctly operate and noise removal processing can be performed for the main subject using an appropriate threshold which takes the physical characteristics of noise and the human visual characteristics into consideration.

In step S19, the TM processing unit 26 performs gradation correction processing, namely, tone curve processing, on the image data obtained after the NR processing using, for example, the normalized gradation correction function represented by the tone curve 83 described above with reference to FIG. 6. The gradation-corrected image data is output to the signal processing unit 16.

In step S20, the signal processing unit 16 performs signal processing on the image data output from the TM processing unit 26, such as displaying an image on the subsequent display unit 17 or converting the image data into image data suitable for recording on the recording unit 18, and outputs resulting image data to the corresponding display unit 17 or recording unit 18.

For example, image data subjected to camera signal processing suitable for displaying an image on the display unit 17 is output to the display unit 17 where an image is displayed. Image data subjected to camera signal processing suitable for recording on the recording unit 18 is recorded onto a recording medium (not illustrated) such as an optical disk or a magnetic disk by the recording unit 18.

Accordingly, the representative value detection unit 71 detects a representative gradation correction value G from the gradation correction function determined for the image data, and the gain processing unit 23 corrects the brightness of the entire image of the image data using the detected representative gradation correction value G. Thus, optimum NR processing can be performed for the main subject. That is, even when gradation correction processing and noise reduction processing are performed in combination, an image with appropriately reduced noise can be obtained.

Furthermore, the TM processing unit 26 operates in cooperation with the gain processing unit 23 to achieve brightness correction of image data in accordance with the determination (gradation correction function) of the DET processing unit 21. That is, in the TM processing unit 26, gradation correction is performed using a normalized gradation correction characteristic with a nature that the brightness of a high-luminance portion is generally reduced. Thus, the occurrence of over-exposure in the subsequent processing performed by the signal processing unit 16 can be prevented or reduced, and the effect of the wide DR imaging can be achieved.

Furthermore, the gradation correction characteristic is normalized by the gradation correction normalization unit 72, and gradation correction is performed by the TM processing unit 26 using the normalized gradation correction function. This can improve or prevent deterioration in signal continuity (smoothness of changes in level) during wide DR imaging while maintaining the performance of the NR processing.

Accordingly, process deterioration involved when gradation correction processing and noise reduction processing are performed in combination can be prevented.

Figure 8:
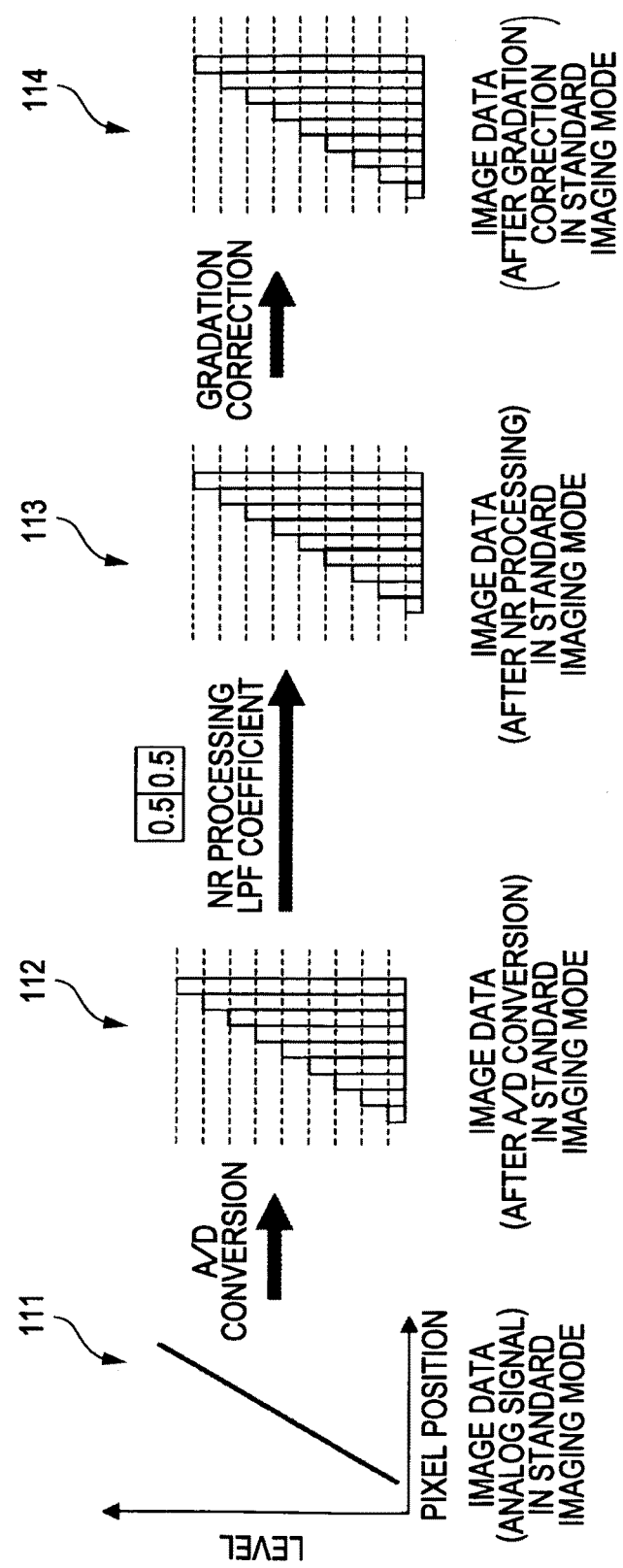
FIG. 8 is a diagram illustrating graphs for signal continuity in respective processes of the related art configuration in the standard imaging mode.
Figure 9:
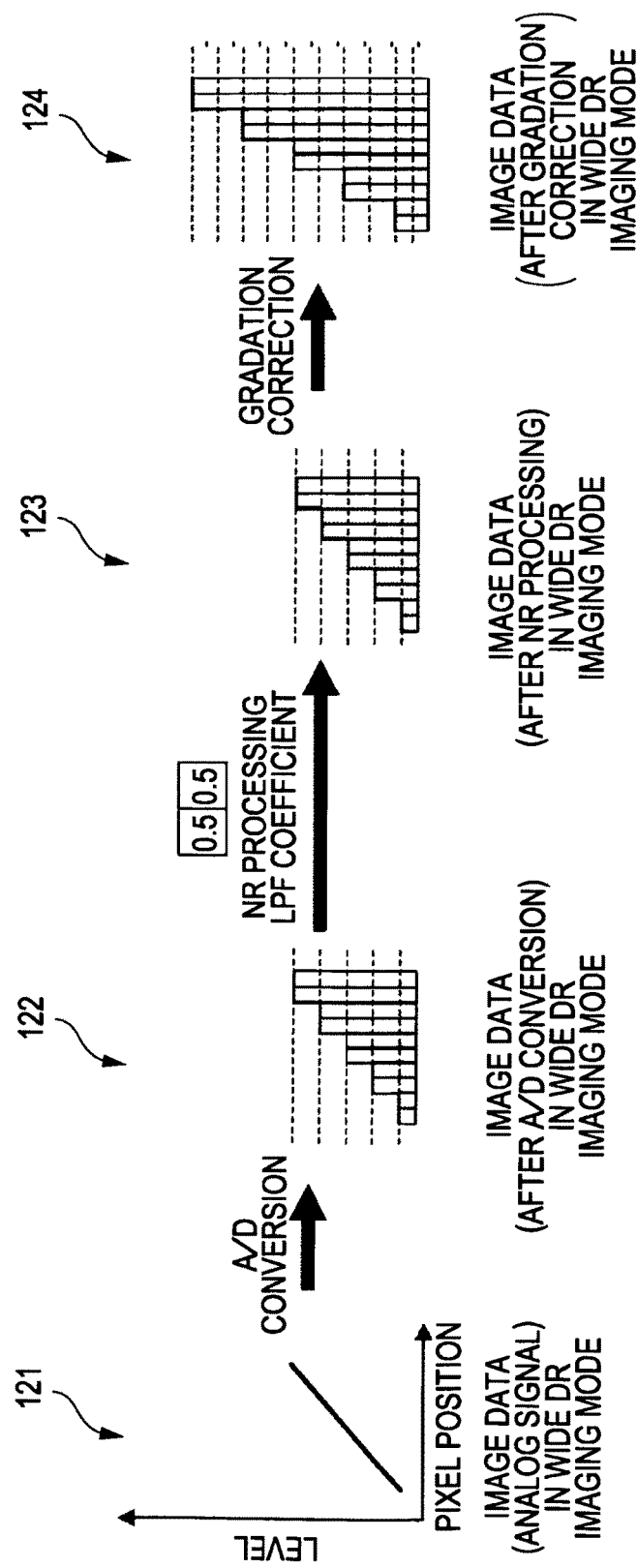
FIG. 9 is a diagram illustrating graphs for signal continuity in respective processes of the related art configuration in the wide DR imaging mode.
Figure 10:
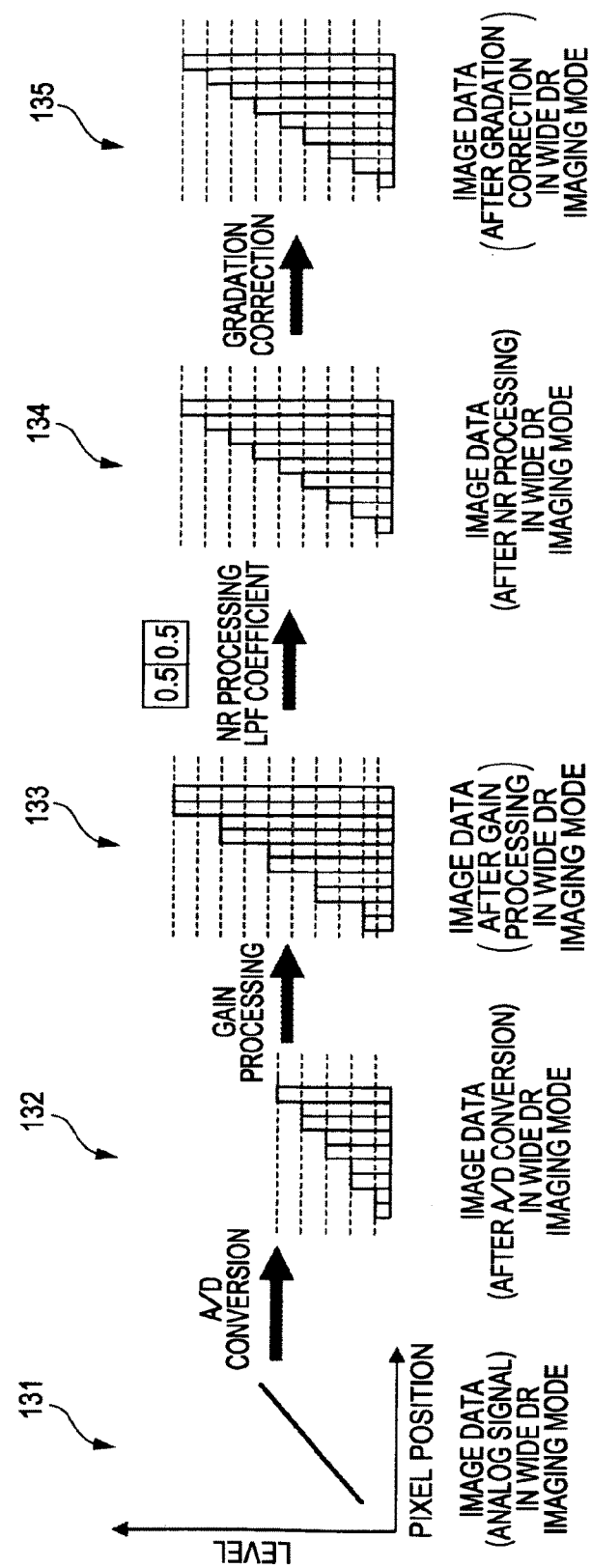
FIG. 10 is a diagram illustrating graphs for signal continuity in respective processes of the image signal processing unit in the wide DR imaging mode.

The improvement or prevention of deterioration in signal continuity during wide DR imaging, described above, will now be described in detail with reference to FIGS. 8 to 10. In FIG. 8, graphs 111 to 114 representing signal continuity in respective processes of a related art configuration in a standard imaging mode are illustrated. In FIG. 9, graphs 121 to 124 representing signal continuity in respective processes of the related art configuration in a wide DR imaging mode are illustrated. In FIG. 10, graphs 131 to 135 representing signal continuity in respective processes of the image signal processing unit 15 in the wide DR imaging mode are illustrated.

In the related art configuration illustrated in FIGS. 8 and 9, it is assumed that NR processing is performed first and then gradation correction processing is performed. Note that the opposite configuration (the configuration in which gradation correction processing is performed first) may cause reduction in the distinction between noise in the NR processing and the original signal and therefore it is difficult to generally use this configuration. Furthermore, in FIGS. 8 to 10, for the convenience of description, as indicated by a 0.5/0.5 NR processing low pass filter (LPF) coefficient, NR processing is performed using a two-tap ε filter.

The graph 111 illustrated in FIG. 8 represents the level at a pixel position of image data of an analog signal. The graph 112 illustrated in FIG. 8 represents signal continuity of image data obtained after A/D conversion. The graph 113 illustrated in FIG. 8 represents signal continuity of image data obtained after the NR processing. The graph 114 illustrated in FIG. 8 represents signal continuity of image data obtained after gradation correction.

The graph 121 illustrated in FIG. 9 represents the level at a pixel position of image data of an analog signal. The graph 122 illustrated in FIG. 9 represents signal continuity of image data obtained after A/D conversion. The graph 123 illustrated in FIG. 9 represents signal continuity of image data obtained after the NR processing. The graph 124 illustrated in FIG. 9 represents signal continuity of image data obtained after gradation correction.

The graph 131 illustrated in FIG. 10 represents the level at a pixel position of image data of an analog signal. The graph 132 illustrated in FIG. 10 represents signal continuity of image data obtained after A/D conversion. The graph 133 illustrated in FIG. 10 represents signal continuity of image data obtained after the gain processing. The graph 134 illustrated in FIG. 10 represents signal continuity of image data obtained after the NR processing. The graph 135 illustrated in FIG. 10 represents signal continuity of image data obtained after gradation correction.

In the graph 111 illustrated in FIG. 8, the graph 121 illustrated in FIG. 9, and the graph 131 illustrated in FIG. 10, the abscissa represents pixel position and the ordinate represents level. That is, it can be seen that the graph 121 illustrated in FIG. 9 and the graph 131 illustrated in FIG. 10 have lower levels than the graph 111 illustrated in FIG. 8.

Furthermore, in the graphs 112 to 114 illustrated in FIG. 8, the graphs 122 to 124 illustrated in FIG. 9, and the graphs 132 to 135 illustrated in FIG. 10, the dotted horizontal scale represents the quantization accuracy, where the gentler the slope of the stepped curve along the scale in each of the graphs, the higher the quantization accuracy which represents consecutive signals. That is, a stepped curve corresponding to one scale in the graphs 112 to 114 illustrated in FIG. 8, the graphs 122 and 123 illustrated in FIG. 9, and the graphs 132, 134, and 135 illustrated in FIG. 10 has a gentler slope than a stepped curve corresponding to two scales in the graph 124 illustrated in FIG. 9 and the graph 133 illustrated in FIG. 10, which represents higher quantization accuracy and consecutive signals.

The wide DR imaging mode in the related art configuration will be described first with reference to the graphs illustrated in FIGS. 8 to 10. As indicated by the graph 111 illustrated in FIG. 8 and the graph 121 illustrated in FIG. 9, in the wide DR imaging mode in the related art configuration, A/D conversion is performed on an analog signal having a lower level than that in the standard imaging.

In the wide DR imaging mode in the related art configuration, NR processing is performed after A/D conversion, and then gradation correction is performed to correct the brightness of the main subject. In this case, the range of the signal assigned to the main subject is increased by the gradation correction. In the wide DR imaging mode in the related art configuration, therefore, after gradation correction, as indicated by the graph 124 illustrated in FIG. 9, image data with signal continuity deteriorated compared to that of the image data obtained in the standard imaging indicated by the graph 114 illustrated in FIG. 8 is output.

In the image signal processing unit 15, in contrast, as indicated by the graph 121 illustrated in FIG. 9 and the graph 131 illustrated in FIG. 10, as in the wide DR imaging mode in the related art configuration, A/D conversion is performed on an analog signal having a lower level than that in standard imaging.

In the image signal processing unit 15, furthermore, after A/D conversion, as indicated by the graph 133 illustrated in FIG. 10, the axis for brightness (abscissa) is stretched by the amount of gain in the gain processing, resulting in the generation of image data with deteriorated signal continuity. That is, an increase in the gain of the digital signal increases the influence of quantization error so that the signal has values which are discontinuous (the amount of change increases, resulting in deterioration in continuity).

However, as indicated by the graph 134 illustrated in FIG. 10, due to the smoothing effect in the subsequent NR processing, this image data can be modified to image data with improved signal continuity. That is, since a threshold ε of an ε filter is generally greater than signal accuracy (=resolution in level), the smoothing effect of the NR processing provides improved signal continuity.

Furthermore, in gradation correction, with the use of the normalized gradation correction characteristic, as described above using the histograms 92 and 93 illustrated in FIG. 6, the level width of the signal of the image, which has been stretched in the NR processing, can be reduced. Therefore, unlike image data obtained after gradation correction of the related art, which is indicated by the graph 124 illustrated in FIG. 9, deterioration of signal continuity does not occur in the gradation correction. Consequently, as indicated by the graph 135 illustrated in FIG. 10, due to the smoothing effect of the NR processing, the image data obtained after gradation correction performed by the image signal processing unit 15 is higher in signal continuity than image data obtained after gradation correction of the related art which is indicated by the graph 124 illustrated in FIG. 9.

Accordingly, NR processing is performed for the main subject whose brightness has been adjusted, thereby optimizing the parameters in the NR processing. Thus, even when NR processing and gradation correction processing are performed in combination, an image with appropriately reduced noise can be obtained.

Furthermore, deterioration of signal continuity, which may be caused by gain processing, can be prevented or reduced and, in addition, the gradation correction processing allows improved signal continuity. As a whole, an image with high signal continuity can be obtained.

While gradation correction has been described in the context of tone curve processing by way of example, dynamic range compression processing may be used instead of tone curve processing.

Dynamic range compression processing is a process for compressing the range of a signal while ensuring fine details of an image. In this processing, technically, an image signal is decomposed or extracted on the basis of spatial features and is separated into two or more components, and the intensities of the signal components are individually adjusted.

For example, Japanese Unexamined Patent Application Publication No. 2001-275015 (corresponding to U.S. Pat. No. 6,965,416B2) describes dynamic range compression processing in which a low-frequency band component of an image is extracted and the range is compressed using a LUT, and in which a high-frequency band component is extracted and highlighted. Japanese Unexamined Patent Application Publication No. 2007-049540 (corresponding to US 2007053607A1) describes dynamic range compression processing in which a low-frequency component of an image is extracted and the range is compressed, and in which a high-frequency component is selectively highlighted using contrast correction.

That is, in a case where the TM processing unit 26 performs gradation correction using the dynamic range compression processing as disclosed in Japanese Unexamined Patent Application Publication No. 2001-275015 or Japanese Unexamined Patent Application Publication No. 2007-049540, for example, tone curve processing based on the normalized gradation correction function is performed on a low-frequency component when the range of the low-frequency component is compressed.

The gradation correction may also be implemented using, for example, shading processing for increasing the brightness of a peripheral portion of an image. A situation in which the TM processing unit 26 performs gradation correction using shading processing serving as a shading process correction for a lens having the function of reducing the amount of exposure of a peripheral portion of an image will now be described with reference to FIG. 11.

Figure 11:
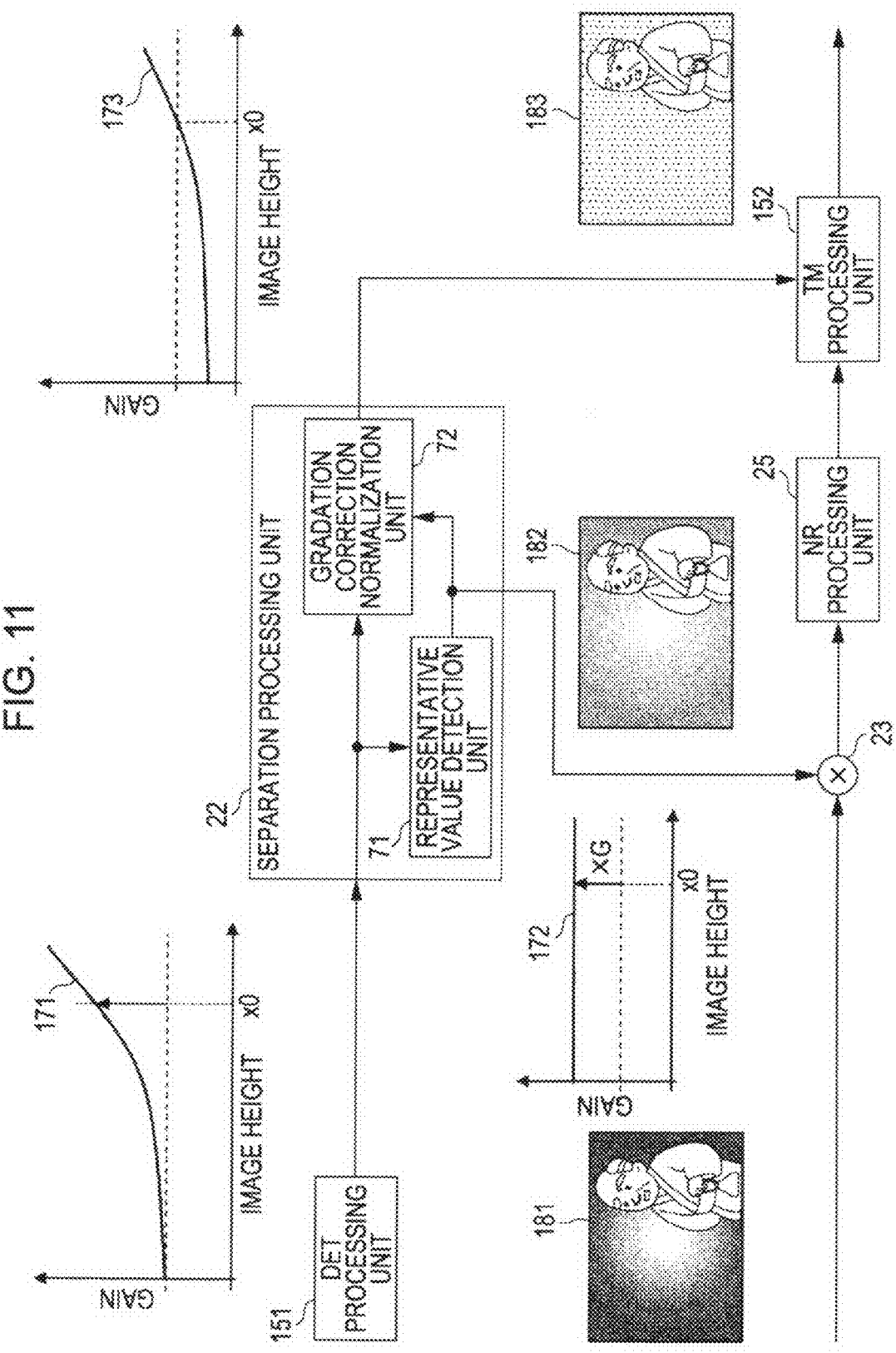
FIG. 11 is a diagram describing gradation correction, namely, shading processing.

FIG. 11 is a diagram illustrating the details of the process performed by the image signal processing unit 15 when gradation correction is performed using shading processing. The example illustrated in FIG. 11 is different from the example illustrated in FIG. 6 in that the DET processing unit 21 and the TM processing unit 26 are replaced by a DET processing unit 151 and a TM processing unit 152, respectively, and the separation processing unit 22, the gain processing unit 23, and the NR processing unit 25 are commonly used.

In the example illustrated in FIG. 11, graphs for gain curves 171 to 173 used for shading correction and images 181 to 183 are illustrated. Although changes in the brightness of a person who is the main subject are not represented in the images 181 to 183, the brightness of the person actually changes in a manner similar to that of the background of the images 181 to 183.

In the graphs for the gain curves 171 to 173, the abscissa represents the image height (pixel position with respect to the position of the optical axis as origin) in the images 181 to 183, where an image height of 0 (at the left end in FIG. 11) indicates the center position of the image 181 (position of the optical axis) and an image height of x0 is the image height of the main subject (the person in the images 181 to 183). The ordinate represents gain.

The gain curve 171 represents the gradation correction characteristic determined by the DET processing unit 151, and the gain curve 172 represents a gain curve (straight line) used for uniformly applying the representative gradation correction value G detected by the representative value detection unit 71. The gain curve 173 represents the normalized gradation correction characteristic determined by the gradation correction normalization unit 72. The images 181 to 183 are images corresponding to image data input to the gain processing unit 23, image data obtained after the gain processing, and image data obtained after gradation correction, respectively.

In the image 181 of the image data obtained by image capture, due to the characteristic of the lens, the closer to the outer edge of the image 181, the darker the colors. This is called shading. In the DET processing unit 151, a gradation correction characteristic for shading correction to optimally adjust the brightness of the main subject is determined.

In this case, a shading correction gain corresponding to a pixel position having an image height of x0 of the main subject, which is represented by the gain curve 171, is used as the gradation correction characteristic. For example, data of the gradation correction characteristic represented by the gain curve 171 is input from the DET processing unit 151 to the representative value detection unit 71 and the gradation correction normalization unit 72.

As in the example illustrated in FIG. 6, the representative value detection unit 71 detects a representative gradation correction value G, which is a value representative of the amount of correction of the gradation correction characteristic determined by the DET processing unit 151, using Equation (1). In a case where a shading correction gain corresponding to a pixel position is used for gradation correction, for example, the average value or maximum value of correction gains within a range of pixel positions defined by the main subject, or simply the maximum value of the correction gains may be used as the representative gradation correction value G. In the detection process for the representative gradation correction value G, an element for correcting the brightness of the main subject is detected.

As in the example illustrated in FIG. 6, the gradation correction normalization unit 72 removes the representative gradation correction value G detected by the representative value detection unit 71 from the gradation correction characteristic determined by the DET processing unit 151 to determine the remaining component using Equation (2). That is, the gradation correction normalization unit 72 normalizes the gradation correction characteristic determined by the DET processing unit 151 with respect to the main subject, and determines a new gradation correction characteristic.

Accordingly, the separation processing unit 22 decomposes the gradation correction characteristic represented by the gain curve 171 into the gain G represented by the gain curve 172, which is uniform for frames, and the normalized gradation correction characteristic represented by the gain curve 173. The representative gradation correction value G detected by the representative value detection unit 71 is output to the gain processing unit 23, and the normalized gradation correction characteristic determined by the gradation correction normalization unit 72 is output to the TM processing unit 152.

As indicated by the gain curve 172, the gain processing unit 23 uniformly applies the gain (representative gradation correction value) G to the input image data. Thus, the brightness of the background and the main subject, which are dark as indicated by the image 181 before the application of the representative gradation correction value G, is corrected so that, as indicated by the background of the image 182, the brightness can be increased in accordance with the main subject.

The NR processing unit 25 performs NR processing on the image data obtained from the gain processing unit 23. At this time, the brightness of the image data has already been adjusted by the gain processing unit 23. Thus, the NR processing unit 25 can perform optimum NR processing for the main subject.

The TM processing unit 152 performs gradation correction, namely, shading correction, on the image data obtained after the NR processing using the normalized gradation correction characteristic represented by the gain curve 173, which has been normalized with respect to an image height of x0 of the main subject. Thus, the image 183 that has been subjected to shading correction can be obtained. That is, as indicated by the background of the image 183, the image 183 that has been corrected so that the closer to the outer edge of the image 183, the brighter the colors and that has been corrected so that both the peripheral portion and the center portion of the image 183 can uniformly be corrected can be obtained.

In the image signal processing unit 15, therefore, the two-stage brightness correction processes are performed by the gain processing unit 23 and the TM processing unit 152, thereby correcting shading of the image data in accordance with the gradation correction characteristic determined by the DET processing unit 151.

Second Embodiment

Figure 12:
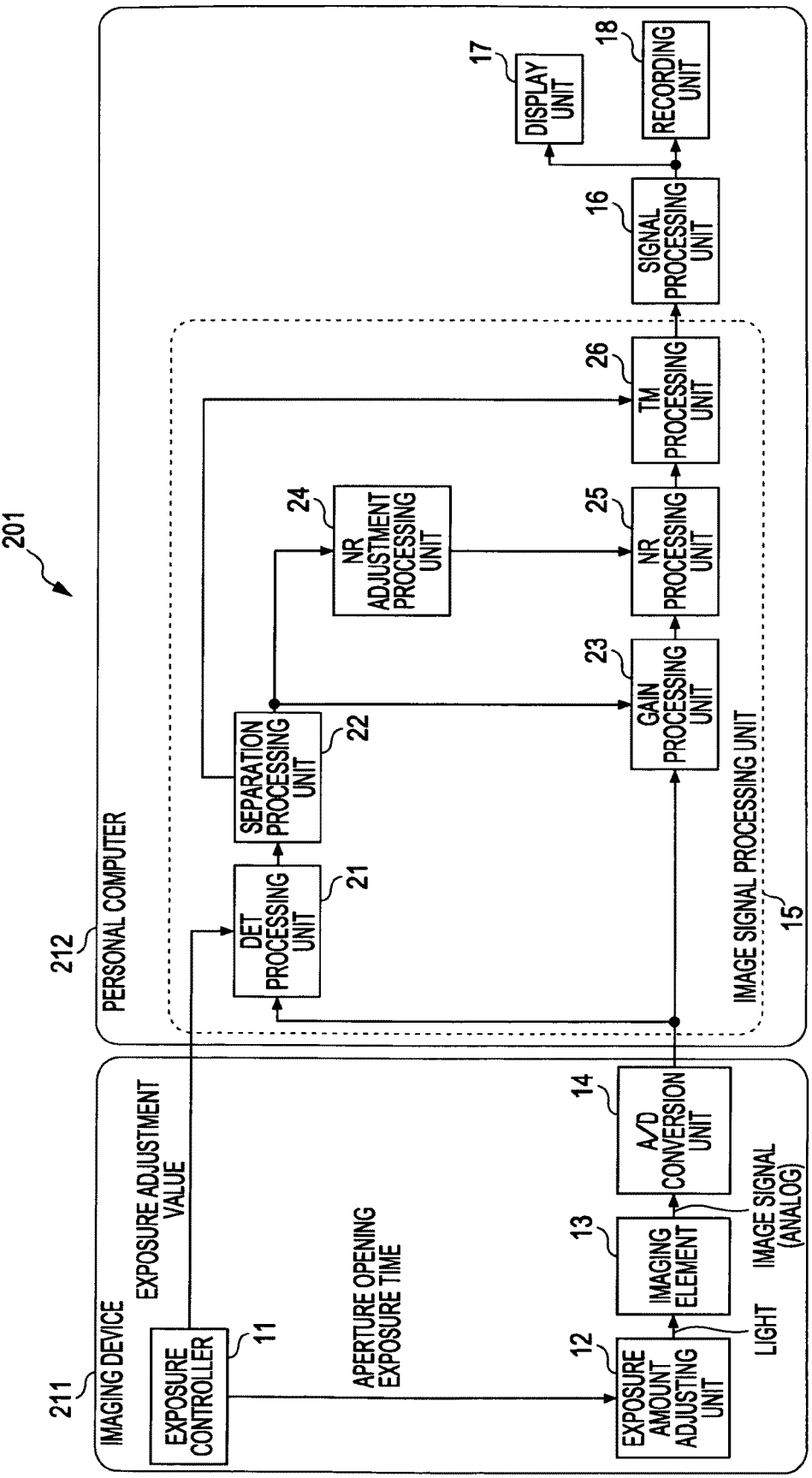
FIG. 12 is a block diagram illustrating an example configuration of an image signal processing system according to an embodiment of the present invention.

FIG. 12 is a block diagram illustrating an example configuration of an image signal processing system 201 including a personal computer serving as an image signal processing apparatus according to an embodiment of the present invention.

In the example illustrated in FIG. 12, the image signal processing system 201 includes an imaging device 211 that includes a first-stage section having the units up to the A/D conversion unit 14 of the digital camera 1 illustrated in FIG. 1, and a personal computer 212 that includes a second-stage section having the image signal processing unit 15 and the subsequent units of the digital camera 1. In the example illustrated in FIG. 12, portions corresponding to those in FIG. 1 are assigned corresponding numerals, and description thereof is omitted due to redundancy.

Specifically, the imaging device 211 includes the exposure controller 11, the exposure amount adjusting unit 12, the imaging element 13, and the A/D conversion unit 14 illustrated in FIG. 1. The imaging device 211 is configured to record undeveloped image data (RAW image data), which has been obtained by capturing an image using the imaging element 13 and converted into digital data using the A/D conversion unit 14, onto a recording medium (not illustrated). The imaging device 211 also records an exposure adjustment value obtained at the time of image capture, which is controlled by the exposure controller 11, as metadata in a RAM image file. The exposure adjustment value is added to, for example, "ExposureBiasValue (ID: 37380)" tag of Exchangeable Image File Format (Exif) information or the like. The tag to be used is an example and other tags such as a vendor-specific tag may be used.

The imaging device 211 delivers RAW image data with added metadata, which is recorded on a recording medium, to the personal computer 212 via, for example, a universal serial bus (USB) cable, the recording medium, a network, or the like.

The personal computer 212 includes the image signal processing unit 15 that includes the DET processing unit 21, the separation processing unit 22, the gain processing unit 23, the NR adjustment processing unit 24, the NR processing unit 25, and the TM processing unit 26, the signal processing unit 16, the display unit 17, and the recording unit 18 illustrated in FIG. 1.

The personal computer 212 acquires RAW image data with added metadata from the imaging device 211, and inputs the RAW image data with the added metadata to the image signal processing unit 15, where the NR processing and the gradation correction processing described above with reference to FIG. 6 are executed.

Specifically, the RAW image data and the metadata added to the RAW image data, namely, the exposure adjustment value, are input to the DET processing unit 21 of the image signal processing unit 15, and are used for determining a gradation correction characteristic. The RAW image data is also input to the gain processing unit 23 of the image signal processing unit 15. The RAW image data is output to the NR processing unit 25 after the brightness has been adjusted, and is output to the TM processing unit 26 after NR processing has been performed to perform gradation correction processing.

Figure 13:
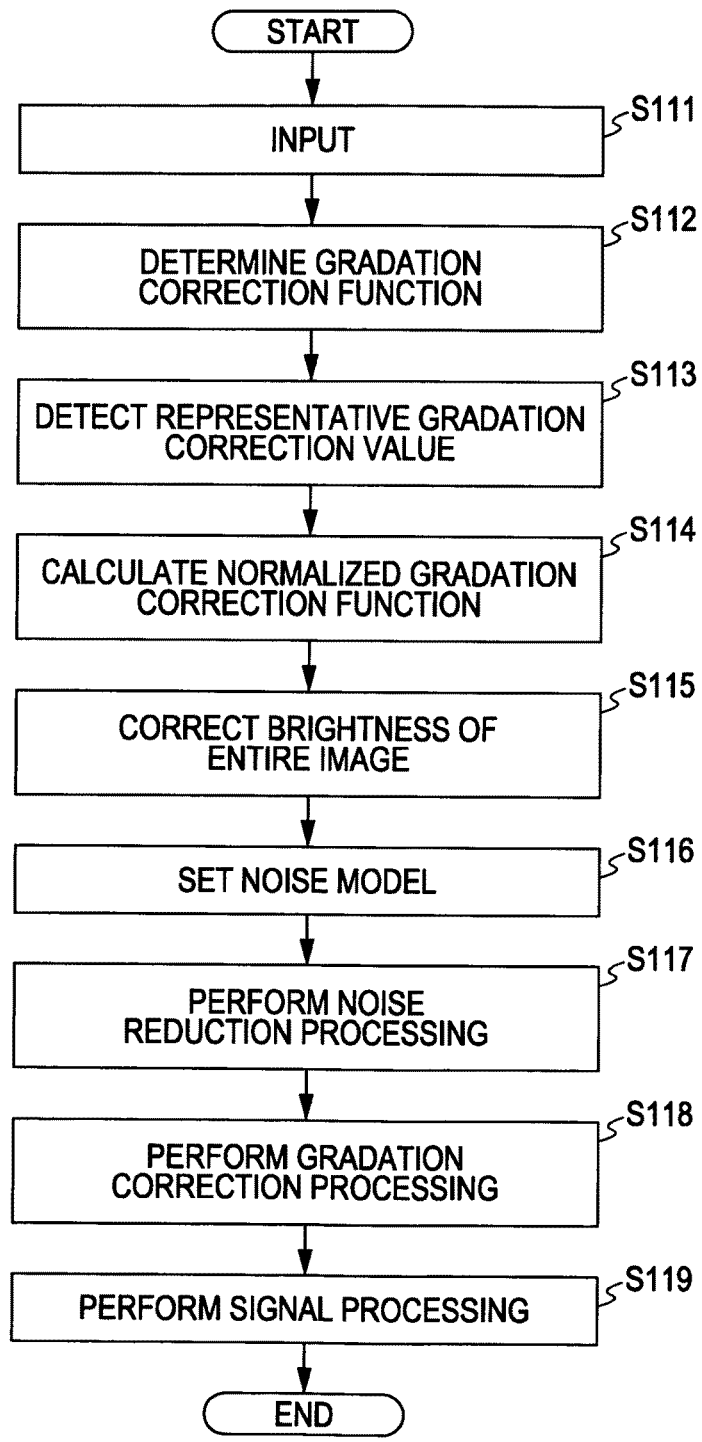
FIG. 13 is a flowchart describing image signal processing of a personal computer illustrated in FIG. 12.

The image signal processing performed by the personal computer 212 will now be described with reference to a flowchart illustrated in FIG. 13. The processing of steps S112 to S119 in FIG. 13 is basically similar to the processing of steps S13 to S20 in FIG. 7, and detailed description thereof is omitted due to redundancy.

For example, the power of the imaging device 211 is turned on by a user operation and the operation mode of the imaging device 211 is switched to a wide DR imaging mode. Since the imaging mode is the wide DR imaging mode, the exposure controller 11 of the imaging device 211 sets an exposure adjustment value (a control value for the exposure amount adjusting unit 12) so as not to extremely reduce the amount of exposure of the main subject while preventing the occurrence of over-exposure in the imaging element 13. The exposure amount adjusting unit 12 adjusts the amount of exposure of the imaging element 13 using the control value output from the exposure controller 11, and performs exposure. The imaging element 13 captures an image of a subject with exposure which has been adjusted by the exposure amount adjusting unit 12.

The exposing light is converted into an analog signal by the imaging element 13, and is further quantized by the A/D conversion unit 14 into digital image data. The undeveloped image data (RAW image data) output from the A/D conversion unit 14 is recorded onto a recording medium (not illustrated) after the exposure adjustment value output from the exposure controller 11 has been added thereto as metadata.

The RAW image data recorded onto the recording medium in the imaging device 211 is delivered to the personal computer 212 via, for example, a USB cable or the like in accordance with a user operation.

In step S111, the personal computer 212 inputs the RAW image data to which the metadata output from the imaging device 211 has been added to the image signal processing unit 15. The RAW image data is input to the DET processing unit 21 and the gain processing unit 23. The exposure adjustment value added to the RAW image data as metadata is input to the DET processing unit 21.

In step S112, the DET processing unit 21 analyzes the image data output from the imaging device 211, and determines a gradation correction characteristic for correcting the brightness of the image data, that is, a gradation correction function representing the gradation correction characteristic, using the exposure adjustment value output from the exposure controller 11. As described above with reference to FIG. 5, the gradation correction function is determined so as to, for example, prevent over-exposure from occurring in the high-luminance portion and increase the brightness of the main subject. The gradation correction function determined by the DET processing unit 21 is output to the representative value detection unit 71 and gradation correction normalization unit 72 of the separation processing unit 22.

In step S113, the representative value detection unit 71 detects a representative gradation correction value G from the gradation correction function determined by the DET processing unit 21. As described above with reference to FIG. 6, for example, when the gradation correction characteristic is represented by function y=f(x), the representative gradation correction value G is determined by Equation (1) using the input/output ratio f(x)/x. The representative gradation correction value G detected by the representative value detection unit 71 is output to the gain processing unit 23 and the NR adjustment processing unit 24.

In step S114, the gradation correction normalization unit 72 determines a normalized gradation correction function f'(x), which represents the normalized gradation correction characteristic, as the remaining component determined by removing the representative gradation correction value G detected by the representative value detection unit 71 from the gradation correction function determined by the DET processing unit 21. As described above with reference to FIG. 6, for example, when the gradation correction characteristic is represented by function y=f(x), the normalized gradation correction function f'(x) is determined by Equation (2) using the representative gradation correction value G detected by the representative value detection unit 71.

The normalized gradation correction function f'(x) determined by the gradation correction normalization unit 72 is output to the TM processing unit 26.

In step S115, the gain processing unit 23 corrects the brightness of the entire image of the image data output from the imaging device 211 using the representative gradation correction value G determined by the representative value detection unit 71. That is, the gain processing unit 23 uniformly applies the gain (representative gradation correction value) G to the image data. Thus, the brightness of the entire image of the image data is corrected in accordance with the main subject. The image data for which the brightness has been corrected by the gain processing unit 23 is output to the NR processing unit 25.

In step S116, the NR adjustment processing unit 24 sets a noise model used by the NR processing unit 25 using the representative gradation correction value G detected by the representative value detection unit 71. That is, the NR adjustment processing unit 24 determines the shape of the function in Equation (3) above by multiplying Equation (7) above by the gain (representative gradation correction value) G and setting a parameter, and sets the determined shape in the noise model used by the NR processing unit 25.

In step S117, the NR processing unit 25 performs NR processing on the image data obtained from the gain processing unit 23. At this time, the brightness of the image data has already been adjusted by the gain processing unit 23. Thus, the NR processing unit 25 can perform optimum NR processing for the main subject. The image data, which has been subjected to the noise removal processing, is output to the subsequent TM processing unit 26.

In step S118, the TM processing unit 26 performs gradation correction, namely, tone curve processing, on image data obtained after the NR processing using the normalized gradation correction characteristic. The gradation-corrected image data is output to the signal processing unit 16.

In step S119, the signal processing unit 16 performs signal processing on the image data output from the TM processing unit 26, such as displaying an image on the subsequent display unit 17 or converting the image data into image data suitable for recording on the recording unit 18, and outputs resulting image data to the corresponding display unit 17 or recording unit 18.

For example, image data subjected to camera signal processing suitable for displaying an image on the display unit 17 is output to the display unit 17 where an image is displayed. Image data subjected to camera signal processing suitable for recording on the recording unit 18 is recorded onto a recording medium (not illustrated) such as an optical disk or a magnetic disk by the recording unit 18.

Accordingly, NR processing is performed for the main subject whose brightness has been adjusted. Thus, even in the personal computer 212 illustrated in FIG. 12, the parameters of the NR processing can be optimized, and an image with appropriately reduced noise can be obtained even when the NR processing and the gradation correction processing are performed in combination.

While the NR processing unit 25 having a block based on a visual model (visual characteristic value calculation unit 32) has been described by way of example, an embodiment of the present invention can also use an NR processing unit that does not explicitly have such a block.

That is, even NR processing without a block explicitly based on a visual model may have a mechanism for, for example, modulating a parameter for each level of pixel. When there is a difference between the parameter and the noise model, it can be considered that an element corresponding to the visual model is included in this parameter. According to an embodiment of the present invention, therefore, as in the NR processing having a block based on a visual model, the performance of the NR processing can be improved.

The series of processes described above can be executed by hardware or software. In a case where the series of processes is executed by software, a program constituting this software is installed into a computer incorporated in dedicated hardware, a general-purpose personal computer, or the like from a program recording medium.

Figure 14:
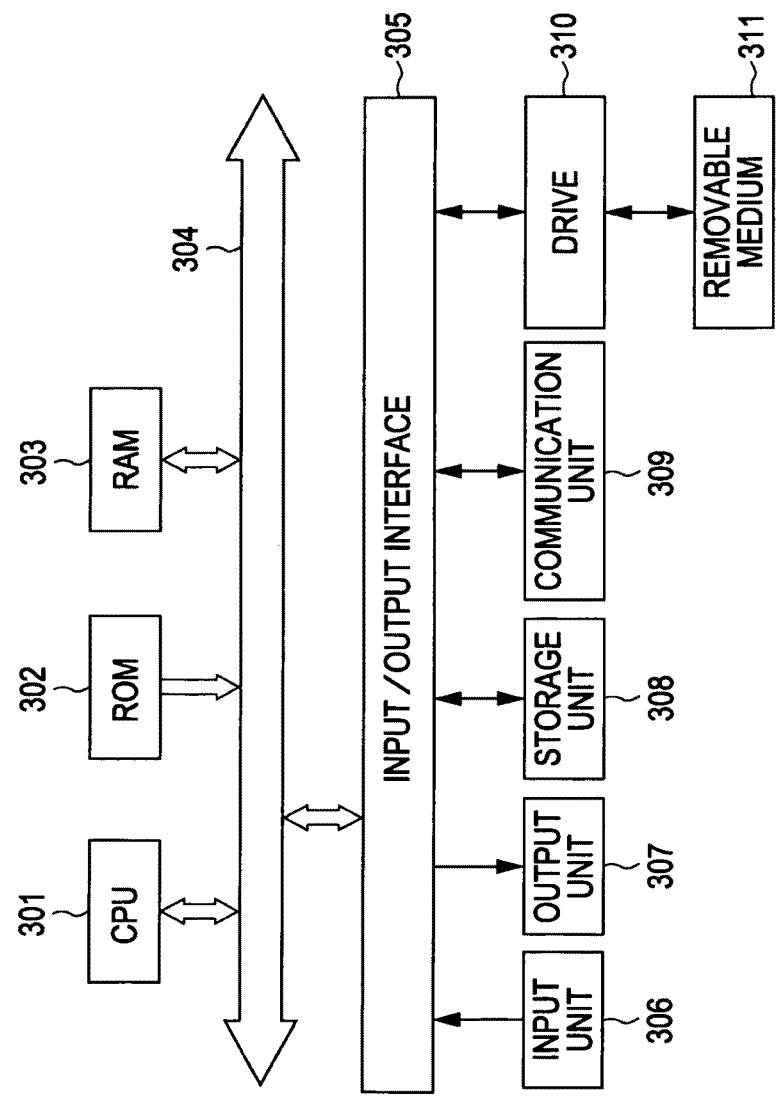
FIG. 14 is a block diagram illustrating an example configuration of hardware of a computer.

FIG. 14 is a block diagram illustrating an example configuration of hardware of a computer that executes the series of processes described above using a program.

A central processing unit (CPU) 301, a read only memory (ROM) 302, and a random access memory (RAM) 303 are connected to one another via a bus 304.

An input/output interface 305 is further connected to the bus 304. The input/output interface 305 is connected to an input unit 306 including a keyboard, a mouse, and the like, and an output unit 307 including a display, speakers, and the like. The bus 304 is also connected to a storage unit 308 including a hardware, a non-volatile memory, and the like, a communication unit 309 including a network interface and the like, and a drive 310 configured to drive a removable medium 311.

In the computer having the above configuration, the CPU 301 loads the program stored in, for example, the storage unit 308 into the RAM 303 via the input/output interface 305 and the bus 304 and executes the program, thereby performing the series of processes described above.

The program executed by the CPU 301 is provided, for example, in form recorded on the removable medium 311 or via a wired or wireless transmission medium such as a local area network, the Internet, or digital broadcasting, and is installed into the storage unit 308.

The program executed by the computer may be a program for which processes are performed in a time series manner in the order described herein or may be a program for which processes are performed in parallel or at necessary timing such as when a process is called.

The term "system", as used herein, refers to an entire apparatus constituted by a plurality of devices.

Embodiments of the present invention are not limited to the embodiment described above, and a variety of modifications can be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing apparatus comprising:
   a control unit configured to determine a gradation correction characteristic representing a conversion characteristic for correcting brightness of an input frame;
   a separation unit configured to separate the gradation correction characteristic determined by the control unit into a representative gradation correction value representing an amount of correction for a representative value of a main subject and a remaining gradation correction characteristic obtained by removing the representative gradation correction value from the gradation correction characteristic;
   a gain processing unit configured to uniformly apply the representative gradation correction value separated by the separation unit to the frame as a gain;
   a noise reduction processing unit configured to perform noise reduction processing on the frame to which the representative gradation correction value is applied by the gain processing unit; and
   a gradation correction processing unit configured to perform gradation correction processing on the frame for which the noise reduction processing has been performed by the noise reduction processing unit using the remaining gradation correction characteristic separated by the separation unit.

2. The image signal processing apparatus according to claim 1, wherein the remaining gradation correction characteristic is a normalized gradation correction function obtained by normalizing the gradation correction characteristic with respect to the representative value of the main subject.

3. The image signal processing apparatus according to claim 2, wherein the gradation correction processing unit performs tone curve processing as the gradation correction processing.

4. The image signal processing apparatus according to claim 2, wherein the gradation correction processing unit performs dynamic range compression processing as the gradation correction processing.

5. The image signal processing apparatus according to claim 2, wherein the gradation correction processing unit performs shading correction processing as the gradation correction processing.

6. The image signal processing apparatus according to claim 2, further comprising a parameter setting unit configured to set a parameter of a noise model of the noise reduction processing using the representative gradation correction value separated by the separation unit.

7. An image signal processing method comprising the steps of:
   determining a gradation correction characteristic representing a conversion characteristic for correcting brightness of an input frame;
   separating the determined gradation correction characteristic into a representative gradation correction value representing an amount of correction for a representative value of a main subject and a remaining gradation correction characteristic obtained by removing the representative gradation correction value from the gradation correction characteristic;
   uniformly applying the separated representative gradation correction value to the frame as a gain;
   performing noise reduction processing on the frame to which the representative gradation correction value is applied; and
   performing gradation correction processing on the frame for which the noise reduction processing has been performed using the separated remaining gradation correction characteristic.

8. A non-transitory computer readable medium having stored thereon a program for causing a computer to execute a process comprising the steps of:
   determining a gradation correction characteristic representing a conversion characteristic for correcting brightness of an input frame;
   separating the determined gradation correction characteristic into a representative gradation correction value representing an amount of correction for a representative value of a main subject and a remaining gradation correction characteristic obtained by removing the representative gradation correction value from the gradation correction characteristic;
   uniformly applying the separated representative gradation correction value to the frame as a gain;
   performing noise reduction processing on the frame to which the representative gradation correction value is applied; and
   performing gradation correction processing on the frame for which the noise reduction processing has been performed using the separated remaining gradation correction characteristic.

* * * * *